(12) United States Patent
Krishnaswamy et al.

(10) Patent No.: US 9,474,069 B2
(45) Date of Patent: Oct. 18, 2016

(54) ENABLING A COMMUNICATION FEASIBILITY DETERMINATION TIME TO COMPLETE COMMUNICATION EXCHANGES BETWEEN AN M2M SERVER AND ONE OR MORE M2M DEVICES

(71) Applicant: QUALCOMM Incorporated, San Diego, CA (US)

(72) Inventors: Dilip Krishnaswamy, Bangalore (IN); Josef Johannes Blanz, Forst an der Weinstrasse (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/500,863

(22) Filed: Sep. 29, 2014

(65) Prior Publication Data
US 2015/0099555 A1  Apr. 9, 2015

Related U.S. Application Data

(60) Provisional application No. 61/888,986, filed on Oct. 9, 2013.

(51) Int. Cl.
| | | |
|---|---|---|
| H04W 72/04 | (2009.01) | |
| H04W 4/00 | (2009.01) | |
| H04W 4/06 | (2009.01) | |
| H04W 4/08 | (2009.01) | |

(52) U.S. Cl.
CPC ......... *H04W 72/0446* (2013.01); *H04W 4/005* (2013.01); *H04W 4/06* (2013.01); *H04W 4/08* (2013.01)

(58) Field of Classification Search
CPC .......................... H04W 72/9445; H04W 4/005
See application file for complete search history.

(56) References Cited

U.S. PATENT DOCUMENTS

| | | | |
|---|---|---|---|
| 8,160,563 B2 | 4/2012 | Chen et al. | |
| 8,433,311 B2 | 4/2013 | Chen et al. | |
| 9,037,126 B2 | 5/2015 | Chen et al. | |
| 2011/0199905 A1 | 8/2011 | Pinheiro et al. | |
| 2013/0034059 A1 | 2/2013 | Lee et al. | |
| 2013/0065585 A1* | 3/2013 | Pelletier | H04W 4/02 455/435.1 |

(Continued)

FOREIGN PATENT DOCUMENTS

EP    2566200 A1    3/2013

OTHER PUBLICATIONS

International Search Report and Written Opinion—PCT/US2014/058375—ISA/EPO—Feb. 5, 2015.

*Primary Examiner* — Bobbak Safaipour
(74) *Attorney, Agent, or Firm* — Arent Fox LLP

(57) ABSTRACT

A method, an apparatus, and a computer program product for machine-to-machine communication are provided. A device receives a request from a requestor. The request requests the device to transmit information to the requestor according to a primary time duration. The device determines at least one secondary time duration within the primary time duration for transmitting the information to the requestor and schedules a transmission time within the at least one secondary time duration to transmit the information to the requestor in response to the request. The scheduling is based on additional information known to the device. A requestor determines a time duration for communicating with at least one device, transmits a request to the at least one device to transmit information to the requestor according to the time duration, and receives in response to the request the information from the at least one device within the time duration.

57 Claims, 16 Drawing Sheets

(56) References Cited

U.S. PATENT DOCUMENTS

| | | |
|---|---|---|
| 2013/0136072 A1 | 5/2013 | Bachmann et al. |
| 2013/0155954 A1 | 6/2013 | Wang et al. |
| 2013/0242748 A1* | 9/2013 | Mangalvedhe ....... H04W 24/02 370/241 |
| 2013/0336236 A1* | 12/2013 | Brus ................. H04W 72/1278 370/329 |
| 2014/0192662 A1* | 7/2014 | Chetlur ............. H04W 72/1252 370/252 |
| 2014/0321314 A1* | 10/2014 | Fodor ................ H04W 72/085 370/252 |

* cited by examiner

ENABLING A COMMUNICATION FEASIBILITY DETERMINATION TIME TO COMPLETE COMMUNICATION EXCHANGES BETWEEN AN M2M SERVER AND ONE OR MORE M2M DEVICES

CROSS-REFERENCE TO RELATED APPLICATION(S)

This application claims the benefit of U.S. Provisional Application Ser. No. 61/888,986, entitled "ENABLING A COMMUNICATION FEASIBILITY DETERMINATION TIME TO COMPLETE COMMUNICATION EXCHANGES BETWEEN AN M2M SERVER AND ONE OR MORE M2M DEVICES" and filed on Oct. 9, 2013, which is expressly incorporated by reference herein in its entirety.

BACKGROUND

1. Field

The present disclosure relates generally to communication systems, and more particularly, to communication services (e.g., using broadcast/multicast methods) for machine-to-machine (M2M) and machine type communications (MTC).

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

The exemplary methods and apparatus discussed infra are applicable to any of a variety of wireless and/or wired communications systems, such as for example, a wireless communication system based on FlashLinQ, WiMedia, Bluetooth, ZigBee, WAN, WLAN, Wi-Fi based on the IEEE 802.11 standard, or GSM, and/or a wired communication system based on wired LAN. To simplify the discussion, the exemplary methods and apparatus are discussed within the context of LTE. However, one of ordinary skill in the art would understand that the exemplary methods and apparatuses are applicable more generally to a variety of other communication systems.

SUMMARY

In an aspect of the disclosure, a method, a computer program product, and an apparatus are provided. The apparatus receives a request from a requestor (e.g., a server or entity requesting specific information or operation/action), the request requesting the device to transmit information to the requestor according to a primary time duration, determines at least one secondary time duration within the primary time duration for transmitting the information to the requestor, and schedules a transmission time within the at least one secondary time duration to transmit the information to the requestor in response to the request, the scheduling based on additional information known to the device.

In another aspect, the apparatus determines a time duration for communicating with at least one device, transmits a request to the at least one device to transmit information to the requestor according to the time duration, and receives in response to the request the information from the at least one device within the time duration.

DETAILED DESCRIPTION

Figure 1:
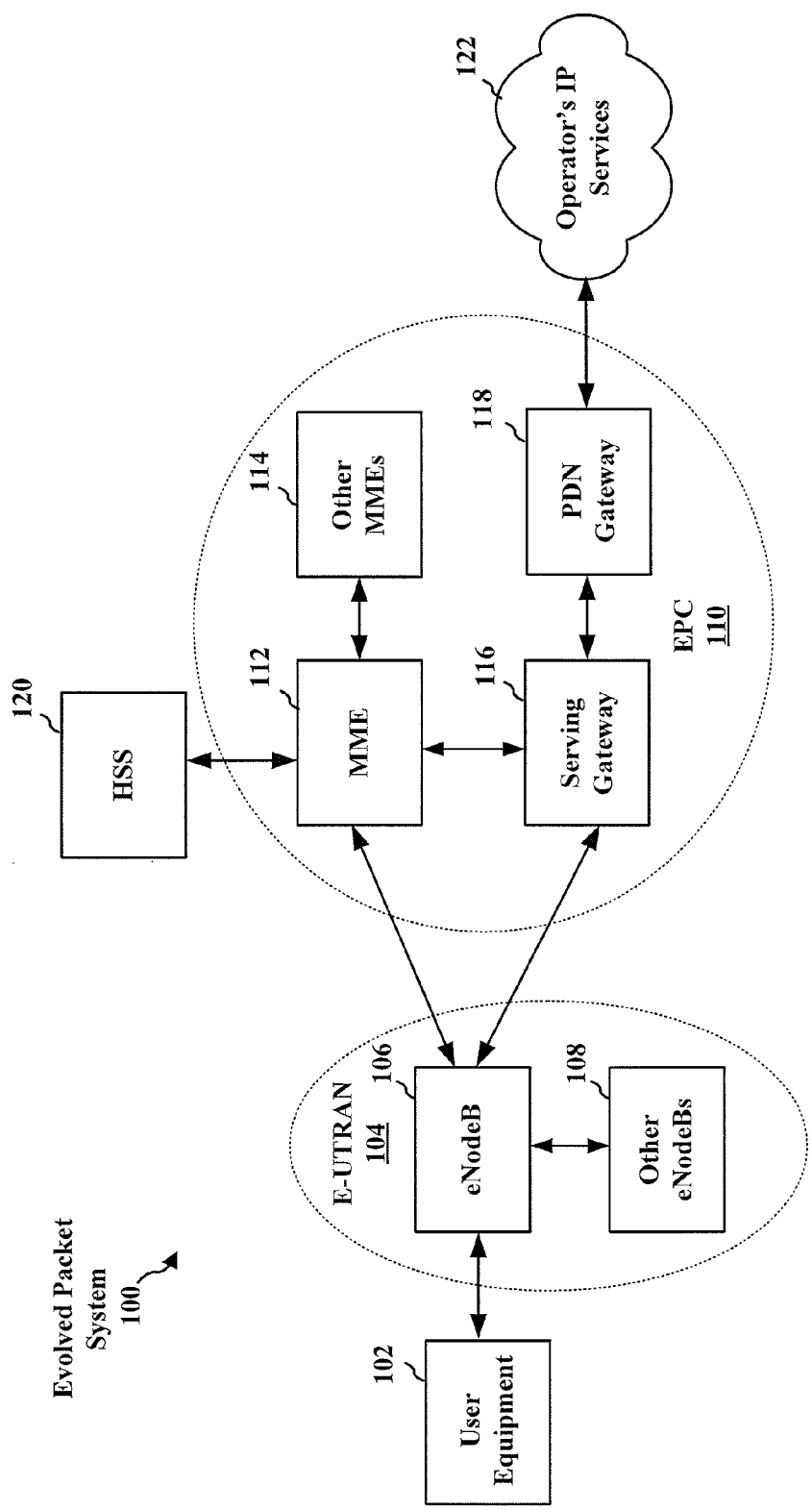
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The exemplary methods and apparatus of the present disclosure provide benefits when used in cellular wireless systems that may use broadcast/multicast mechanisms. The present disclosure is applicable to any of a variety of wireless communications systems (e.g., FlashLinQ, WiMedia, Bluetooth, ZigBee, WAN, WLAN, Wi-Fi, or GSM) and/or wired communications systems (e.g. wired LAN). To simplify the discussion, the exemplary methods and apparatus are discussed within the context of LTE. However, one of ordinary skill in the art would understand that the exemplary methods and apparatuses are applicable more generally to a variety of other communication systems. FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
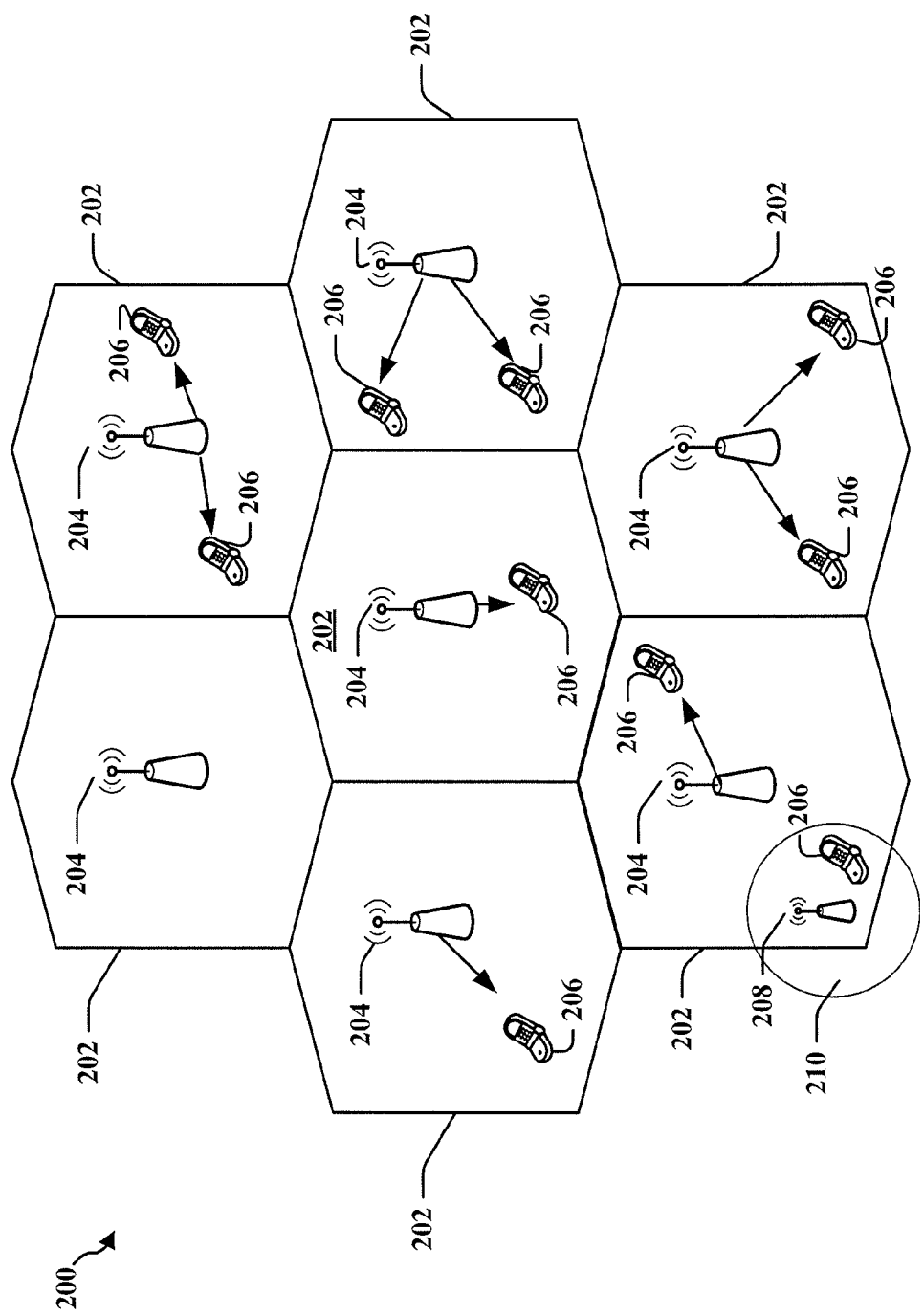
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

As those skilled in the art will readily appreciate from the detailed description to follow, the various concepts presented herein are well suited for LTE applications. However, these concepts may be readily extended to other telecommunication standards. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard employed will depend on the specific application and the overall design constraints imposed on the system.

Figure 3:
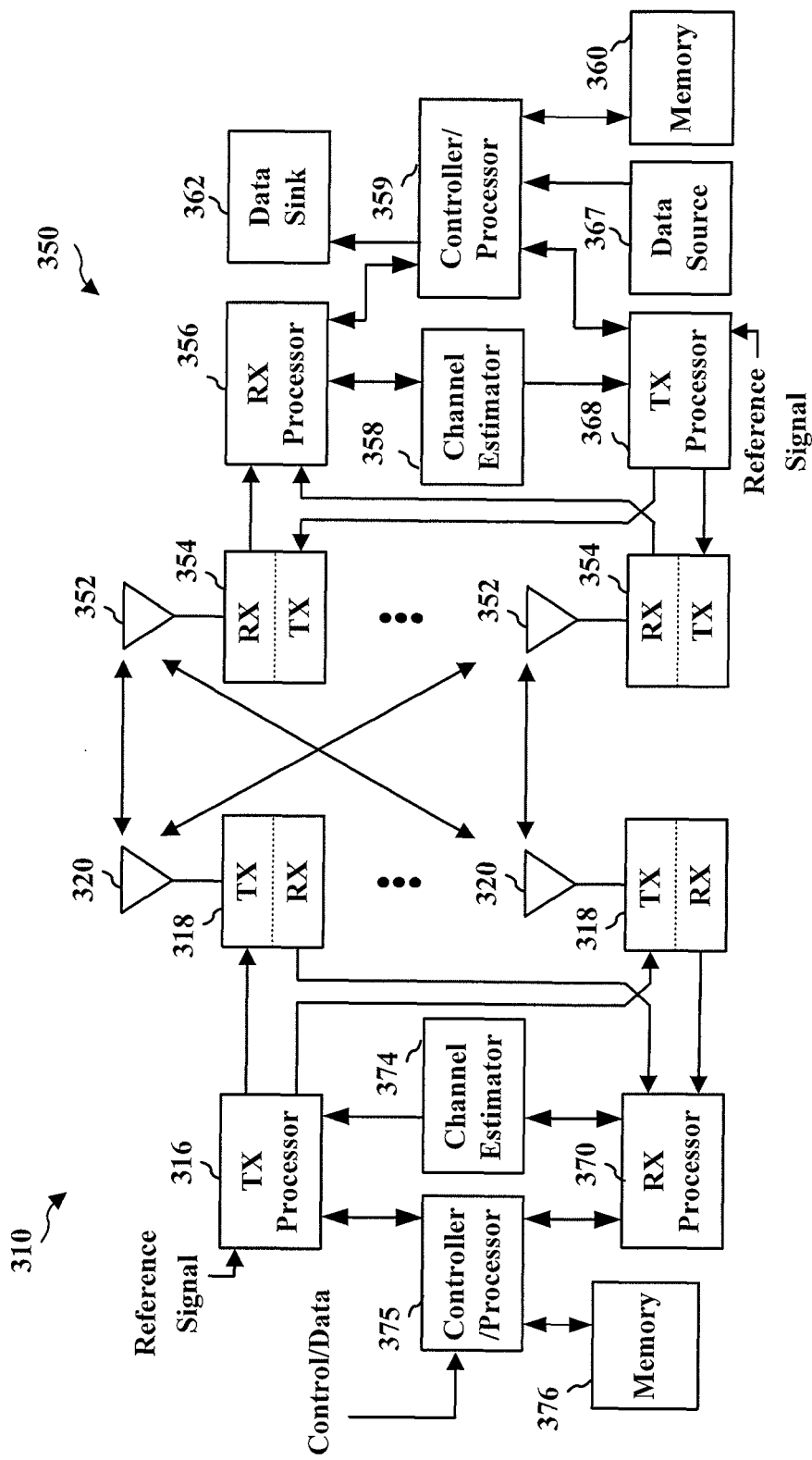
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. The controller/processor 375 implements the functionality of an L2 layer. In the DL, the controller/processor 375 provides header compression, ciphering, packet segmentation and reordering, multiplexing between logical, and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions for an L1 layer (i.e., physical layer). The signal processing functions includes coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream is then provided to a different antenna 320 via a separate transmitter 318TX. Each transmitter 318TX modulates an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions of the L1 layer. The RX processor 356 performs spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 implements the L2 layer. The controller/processor can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362, which represents all the protocol layers above the L2 layer. Various control signals may also be provided to the data sink 362 for L3 processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. The data source 367 represents all protocol layers above the L2 layer. Similar to the functionality described in connection with the DL transmission by the eNB 310, the controller/processor 359 implements the L2 layer for the user plane and the control plane by providing header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 are provided to different antenna 352 via separate transmitters 354TX. Each transmitter 354TX modulates an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370. The RX processor 370 may implement the L1 layer.

The controller/processor 375 implements the L2 layer. The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Broadcast/multicast mechanisms are more efficient when the same machine type communications (MTC) data or machine-to-machine (M2M) data are to be sent to a group of user devices. One such broadcast/multicast mechanism is cell broadcast service/public warning system (CBS/PWS). The CBS/PWS includes the earthquake and tsunami warning system (ETWS) and the commercial mobile alert service (CMAS). The CBS/PWS mechanism is suitable for small text data download and does not require device triggering. "Device trigger" as used herein refers generally to the concept of waking a device, e.g. UE, from an idle or sleeping state in order to receive data. Another broadcast/multicast mechanism is the multimedia broadcast multicast service (MBMS) and evolved (eMBMS) for LTE. This mechanism is suitable for multimedia data download, and typically relies on device triggering.

Broadcast/multicast of MTC/M2M data may be scheduled or unscheduled. In scheduled broadcasts, the broadcast/multicast mechanism broadcasts in accordance with a preset schedule and the user device, aware of that schedule, receives the broadcast data. An example of a scheduled data broadcast includes daily or weekly downloads of newspaper articles. In cases of unscheduled broadcasts, neither the broadcast mechanism nor the user device knows in advance when a broadcast will occur. In this case, the broadcast/multicast mechanism is triggered into broadcasting the data and the user device is triggered into receiving the data. Examples of unscheduled data broadcasts include device software and firmware updates and common commands or messages to a large number of devices to initiate an action (e.g., turn on/off street lights, message to smart meters to get report on a dynamic basis etc).

A drawback with current multicast/broadcast mechanisms is that whenever data is broadcast/multicast the user device wakes up whether or not the data being sent is intended for it. To address this drawback, mechanisms described herein introduce concepts that allow user devices to wake up only when data intended to be received by the device is being broadcast. To this end, mechanisms disclosed herein involve assignment of one or more classes to a user device. These classes, as described further below, may include a hierarchical organization of categories, groups, sub-groups and/or sub-sub-groups. These classes, in combination with CBS/PWS, MBMS and eMBMS mechanisms, allow for user devices to awake only when data associated with one of its assigned classes is being multicast/broadcast.

MTC Classes, defined for example, by MTC category or group IDs, may be assigned to a MTC device via pre-configuration or may be assigned by network, for example, via MTC service registration and request procedures. The MTC category can be smart grid, health care, etc. The MTC group ID may be assigned for each MTC group including category information. For example Group ID1 may be San Diego Gas and Electric (SDGE) meter readers. Categories/group IDs can be signaled to devices through a paging message, for example, under CMAS-indication, CMAS-indication-Group-X and CMAS-indication-Group-Y may be added. In another example, MTC-Indication and MTC-Indication-Group x may be added in existing SIBs or be added in a new SIB introduced for MTC. In yet another example, eMBMS-indication or further eMBMS-indication-Group-x and eMBMS-indication-Group-y (currently systemInfoModification indicates any broadcast control channel (BCCH) modification other than SIB10/11/12) may be added in paging message or SIB. By adding such group indication information, the UE can quickly go back to sleep unless there is data intended to be received by the device belonging to the group.

As mentioned above, class or group indication may be hierarchical and include a first tier, category/group information through a paging message followed by a second tier, subgroup information by SIB. Currently all UEs capable of CBS/PWS wake up whenever there is a change in SIB10, SIB11 or SIB12. Therefore, adding MTC category and/or group information in paging message or SIB10, SIB11 or SIB12 help devices to go back to sleep as earlier as possible.

For multicast/broadcast employing eMBMS/MBMS mechanisms, it would be beneficial to introduce user service description (USD) change period (including period for certain category/group) so that the user device does not need to wake up frequently to check USD update. The device only wakes up to check USD when there is a potential USD update. MTC device category and/or group may be included in USD, and/or may be added to SIB13 which is used for device triggering.

Regarding scheduling of broadcasts/multicasts using CBS/PWS mechanisms, UE battery life would be conserved if the UE knew its group schedule. To this end, schedule information may be sent through unicast, USD or CBS/PWS itself. Regarding scheduling in MBMS/eMBMS, a proprietary blob may be included in USD for each category and/or group. Instead of a common schedule for all groups, each group will have a unique schedule.

Current SIBs and channels relevant to the above outlined multicast/broadcast enhancements include: SIB10, which contains an earthquake and tsunami warning system (ETWS) primary notification; SIB11, which contains an ETWS secondary notification; SIB12, which contains a commercial mobile alert service (CMAS) notification; and SIB13, which contains the information required to acquire the MBMS control information associated with one or more MBSFN areas. ETWS and/or CMAS capable UEs in RRC_CONNECTED read paging at least once every defaultPagingCycle to check whether ETWS and/or CMAS notification is present or not. The paging message includes the ETWS-Indication and CMAS-Indication. The master information block (MIB) is sent over the physical broadcast channel (PBCH) and all system information blocks (SIBs) and paging are sent over the physical downlink shared channel (PDSCH).

As mentioned above, in order to multicast/broadcast data to a group of user devices, the devices are associated with an MTC class, i.e., a category having one or more associated groups, sub-groups and/or sub-sub groups, corresponding to data intended for receipt by the group of UEs. Within each category a hierarchy of group IDs may exist. For example, as shown in Table 1 below, MTC categories may include consumer electronics (CE), healthcare, automotive and metering. Each category has an assigned group ID. A group ID may have one or more associated sub-group IDs and a sub-group ID may have one or more associated sub-sub-group IDs.

TABLE 1

| M2M Categories | Group ID | Sub-Group ID | Sub-Sub-GroupID |
|---|---|---|---|
| Consumer Electronics | M2M-CE | M2M-CE-Alarms M2M-CE-Cameras M2M-CE-Tracking M2M-CE-Gadget | |
| Healthcare | M2M-Health | M2M-Health-WWANGateway M2M-Health-EmbeddedWWAN M2M-Health-Smartphone M2M-Health-CareProvider | |
| Automotive | M2M-Auto | M2M-Auto-Telematics M2M-Auto-HeadUnit M2M-Auto-EVChargers | |
| Metering | M2M-Meter | M2M-Meter-Home M2M-Meter-Enterprise M2M-Meter-Commercial | M2M-Meter-Home-Electric M2M-Meter-Home-Gas M2M-Meter-Home-Water |

A user device may be associated with one or more group IDs, sub-group IDs or sub-sub-group IDs such that the device is set up to receive broadcast/multicast data corresponding to one or more of the IDs. For ease in further description, the term "group ID," is intended to encompass all levels of ID, including group, sub-group and sub-sub-group.

Group IDs may be allocated by an operator or a service provider. For example, in the case of allocation by an operator, mobile country code/mobile network code (MCC/MNC) can be included in group ID, and in the case of a service provider, MCC/Service provider ID can be included in Group ID. Group IDs may also be allocated by a M2M international forum, such as OneM2M.

Group ID assignment to user devices may occur through preconfiguration or through online assignment. In the case of preconfiguration, a device may register its group ID with an MTC server during MTC service registration. In cases of online assignment, the MTC server may assign a group ID to the device during MTC service registration. Also, an operator may assign a group ID during attach procedures, in which case the device subsequently registers its assigned group ID with the MTC server during MTC service registration.

Figure 4:
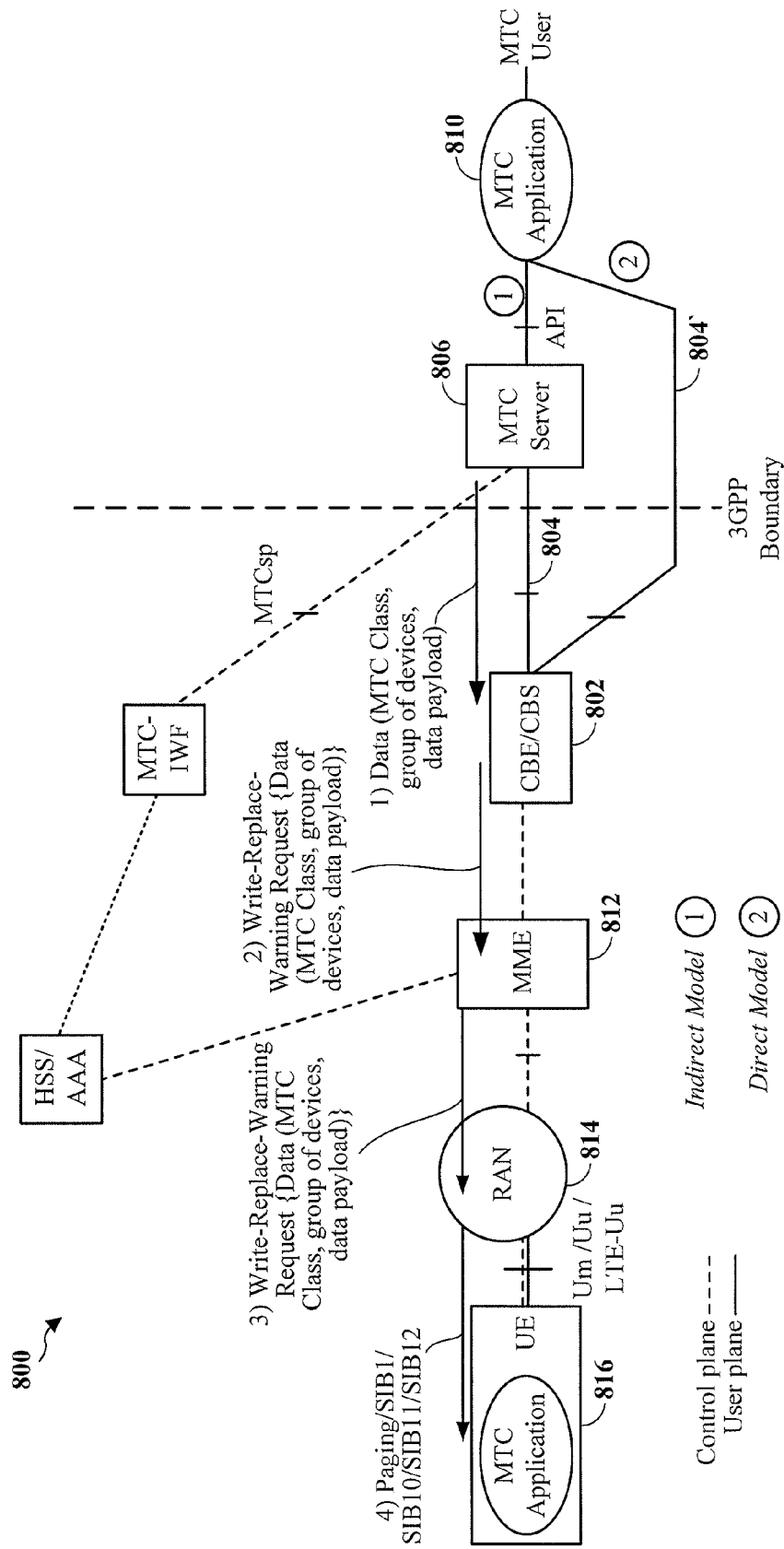
FIG. 4 is a diagram illustrating a first CBS/PWS architecture used data downloading.

Multicast/Broadcast Using CBS/PWS:

FIG. 4 is a diagram 800 illustrating a first CBS/PWS architecture used for multicast/broadcast data downloading. In this multicast/broadcast mechanism, a cell broadcasting entity (CBE)/CBS 802 is used for data downloading. A set of data 804 is sent from a MTC server 806 to the CBE/CBS 808. Alternatively, the set of data 804' may be sent from a MTC application 810. This set of data 804, 804' includes data identifying a MTC class, including relevant groups IDs, associated with the data to be multicast/broadcast. The data set 804, 804' further includes the data that is to be multicast/broadcast.

The CBE/CBS 802, in turn, sends the set of data 804, 804' directly to a mobility management entity (MME) 812 using the write-replace-warning request protocol. The MME 812 then sends the set of data 804, 804' to a radio access network (RAN) 814. The RAN 814 sends a wakeup indication to user devices, now on referred to as UEs 816, within the group of an upcoming data multicast/broadcast. Such indication may be through a group ID included in a paging message sent to the UEs 816 or in SIB1. For one example, in a paging message the group ID is not included, instead, an ETWS-Indication or a CMAS-Indication is used. Upon receipt of such indication, the UEs 816 wake up and receive a multicast/broadcast schedule, which is also sent by the RAN 814. This schedule may be received, for example, through SIB1 (SIB1 provides the schedule for SIB10/SIB11/SIB12 or a new SIB). In accordance with the received schedule, the RAN 814 sends the data on one or more of SIB10, SIB11 and SIB12, and new SIB, and the UEs 816 receive the data. In another example, in a paging message the group ID is included. Upon receipt of such group indication, the UEs belonging to that group 816 wake up and receive a SIB1. The rest of devices can go back to sleep. In accordance with the received schedule in SIB1, the RAN 814 sends the data on one or more of SIB10, SIB11, SIB12, and new SIB, and the UEs 816 receive the data.

Figure 5:
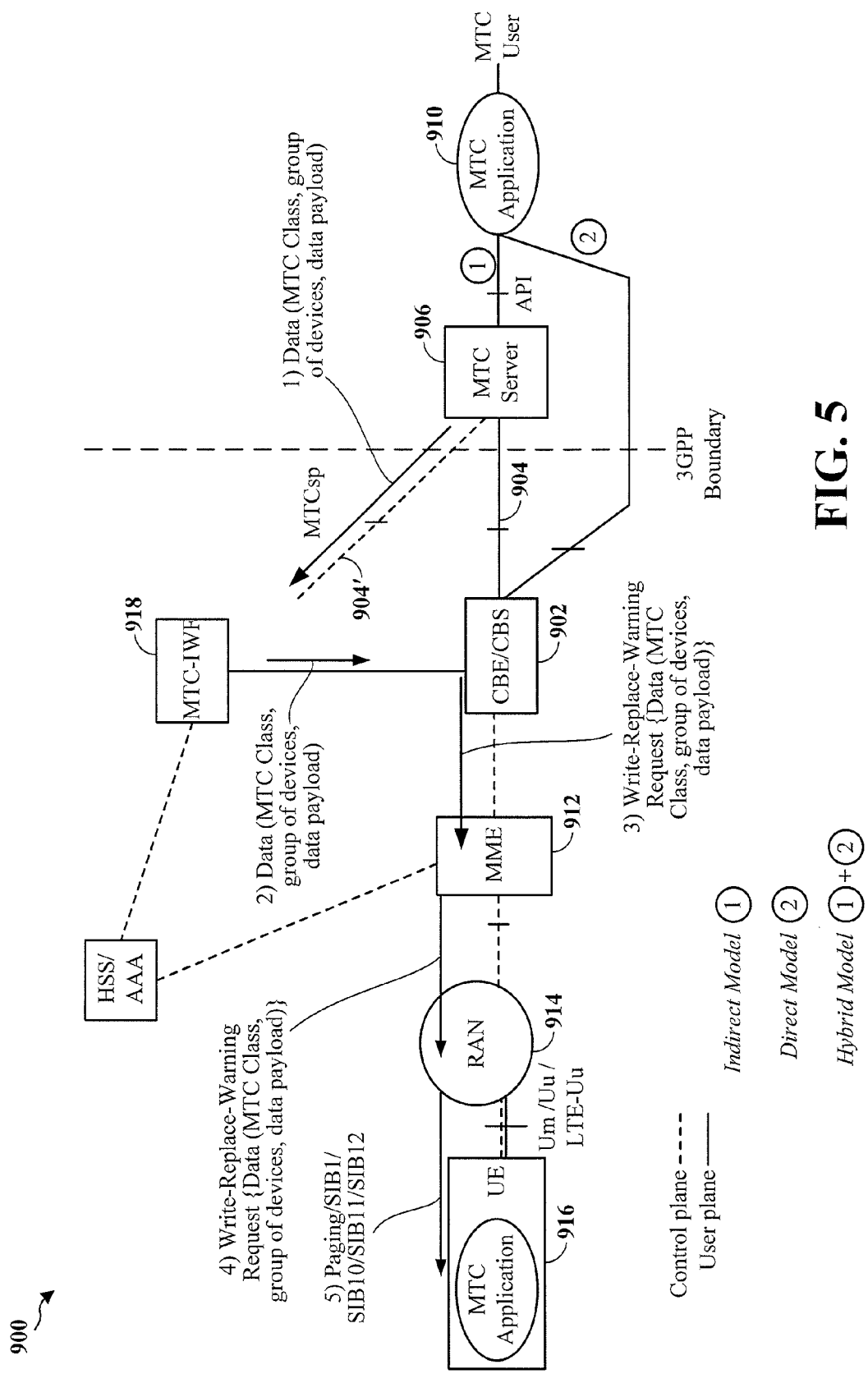
FIG. 5 is a diagram illustrating a second CBS/PWS architecture used data download.

FIG. 5 is a diagram 900 illustrating a second CBS/PWS architecture used for multicast/broadcast data download. In this downloading mechanism, a CBE/CBS 902 is used for data downloading. A set of data 904 is sent from a MTC server 906 directly to a MTC interworking function (MTC-IWF) 918 instead of directly to the CBE/CBS 902, as done in the mechanism of FIG. 4. The set of data 904 is sent to the MTC-IWF 918 in cases where the MTC server 906 does not have any information with respect to the UEs 916 for which the data is intended or MTC server doesn't have direct communication to CBE/CBS. In this case, the MTC-IWF can decide whether to use unicast channel (if the devices are distributed separately in different cells) or use cell broadcasting if multiple devices are located in the same cells/locations.

The set of data 904 includes data identifying a MTC class, including relevant groups IDs, associated with the data to be multicast/broadcast. The data set 904 further includes the data that is to be multicast/broadcast. The data set 904 may also include a device trigger. The MTC-IWF 918 includes mapping information that maps the data to be multicast/broadcast to one or more CBE/CBSs 902 and associated RANs 914 within target range of the UEs assigned to the group ID. Based on this mapping information, the MTC-IWF 918 sends the data to the appropriate CBE/CBS 902. Communication from the MTC server 906 to the MTC-IWF 918 gives more flexibility in the architecture in terms of group IDs that are being used for UEs. They could be group IDs that are associated with the interim application at the MTC application 910 or MTC server 906 level. Mapping between what the interim application is targeting verses what device the RAN needs to target may be necessary.

The set of data 904 can also include a duration of time T over which the UEs can respond or send an acknowledgement over a unicast connection to the MTC server, if a response is desired. The UEs can stagger their responses during this duration T, so as to distribute the load associated with the unicast accesses of the UEs over that period of time, so that the network does not get congested. The set of data 904 can also include the IP address of an alternate server to which the UEs can communicate with, to attempt a file repair associated with the information received. The MTC server 906 can further attempt to target subgroups of UEs at a time, to prioritize the groups in sequence. For example, in a smart grid case, for a demand response scenario with a request for load shedding, a higher priority group can be targeted first, followed by lower priority groups. For example, the MTC_Meter_Enterprise group may be a higher priority group than MTC_Meter_Home group, because an enterprise may be able to shed more load than an individual home, when requested. In this case, the MTC server 906 suggests a time $T_i$ to each subgroup i, in the set of data 904. The MTC server 906 targets each subgroup i (or subsubgroups as the case may be), in sequence, to distribute the unicast response load on the network from the UEs. Alternatively, the MTC server 906 may send a multi-class (or multi-group) broadcast message to the MTC-IWF 918 or directly to the CBE/CBS 902, such as <B1, C1, T1, C2, T2, C3, T3, . . . > where B1 is a broadcast message identifier, C1, C2, C3 are different prioritized groups of devices, in order of decreasing priority and T1, T2 and T3 are times, where T1<T2<T3. Devices with priority group/class C1, can respond in time t where 0<t<T1, devices with priority class C2 can respond in time t where T1<t<T2, and devices with priority class C3 can respond in time t where T2<t<T3. The CBE/CBS 902 can then target each MTC group/class with separate broadcast messages separated in time to distribute the unicast response load on the network. It is also possible that multiple subgroups are targeted simultaneously, where such subgroups may target different repair servers, to distribute the load on the repair servers. Additional description of the forgoing broadcast support concept for M2M devices is provided further below under the Broadcast Support for M2M section.

The CBE/CBS 902, in turn, sends the set of data 904 to the MME 912 using a write-replace-warning request protocol. The MME 912 then sends the set of data 904 to the RAN 914. The RAN 914 sends an indication to UEs 916 within the group informing the UEs of an upcoming data multicast/broadcast. Such indication may be through a group ID included in a paging message sent to the UEs 916 or in SIB10/SIB11/SIB12 or a new SIB. Upon receipt of such indication, the UEs belonging to the group(s) 916 wake up and receive a multicast/broadcast schedule, which is also sent by the RAN 914. This schedule may be received, for example, through SIB1. In accordance with the received schedule, the RAN 914 broadcasts the date on one or more of SIB10, SIB11 and SIB12, and the UEs 916 receive the data.

FIG. 4 and FIG. 5 thus represent two similar CBS/PWS architectures for multicasting/broadcasting data. The first architecture of FIG. 4 assumes mapping information is resident in the CBE/CBS. In the second architecture of FIG. 5, mapping information is not resident in the CBE/CBS and is obtained through the MTC-IWF.

Figure 6:
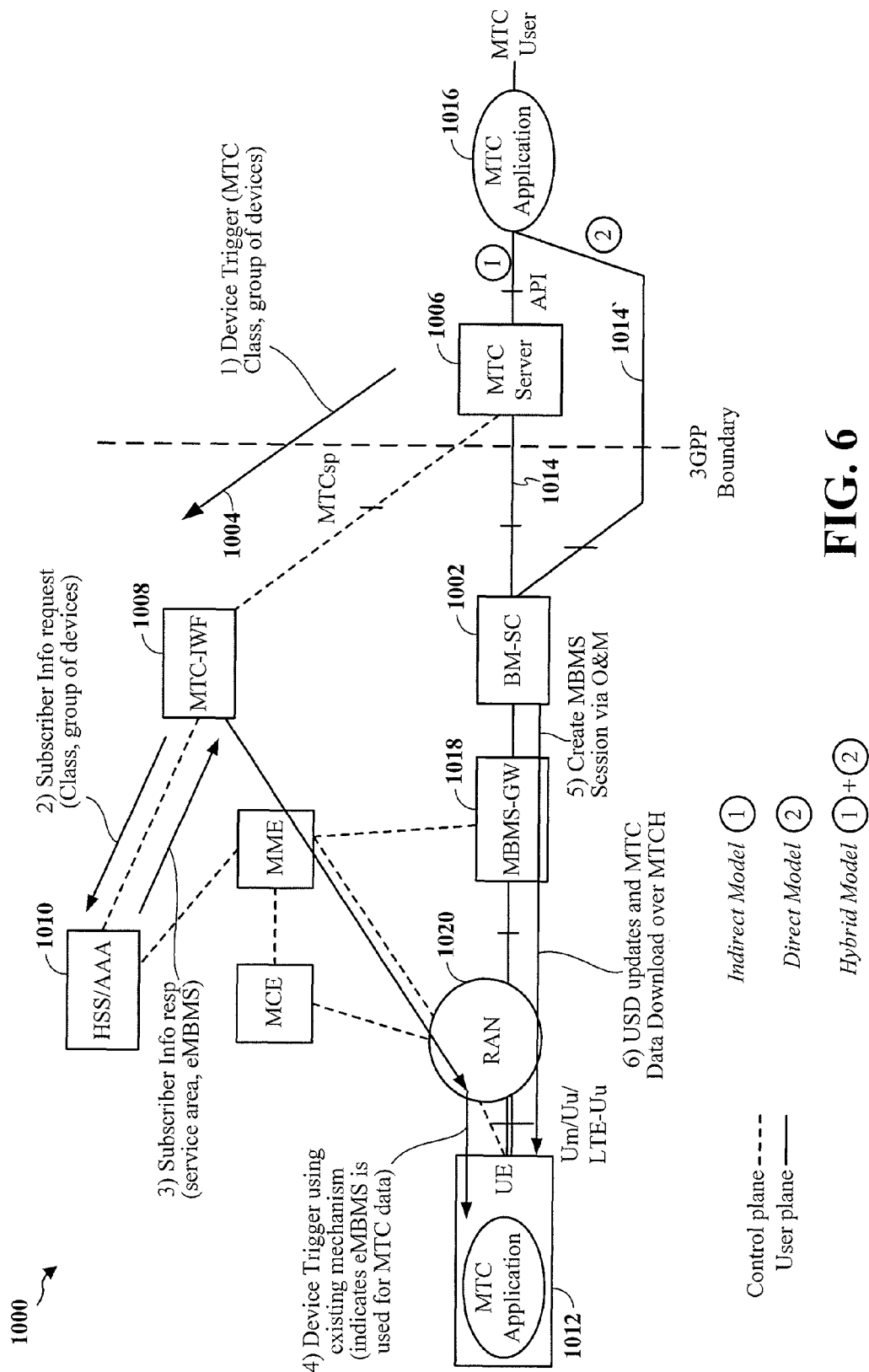
FIG. 6 is a diagram illustrating a first MTC architecture using eMBMS for data/content downloading.

Multicast/Broadcast Using MBMS/eMBMS:

FIG. 6 is a diagram 1000 illustrating a first MTC architecture using eMBMS for data downloading. In this multicast/broadcast mechanism, a broadcast multicast service center (BM-SC) 1002 is used for data downloading. In the case of an unscheduled download, a device trigger 1004 is sent from a MTC server 1006 to a MTC-IWF 1008. The MTC-IWF 1008 requests subscription information from a HSS/AAA 1010 to know where to send and to get mapping information. The HSS/AAA 1010 sends subscription information to the MTC-IWF 1008. The MTC-IWF 1008 sends the device trigger 1004' to the UEs 1012 through the RAN 1014. The device trigger 1004' is sent to the UEs 1012 using existing mechanisms, such as a unicast channel device trigger mechanism, and provides an indication that eMBMS is being used to multicast/broadcast the data. The device trigger may include group ID information.

Data 1014, 1014' to be downloaded is sent from the MT server 1006 or MTC application 1016 to the BM-SC 1002. The BM-SC 1002 sends the data directly to the MBMS gateway (MBMS-GW) 1018. The MBMS-GW 1018 then sends the data to the radio access network (RAN) 1020. Upon receiving the device trigger from the network to indicate MBMS is used for data downloading, the UEs 1012 reads USD updates for download information and the multicast traffic channel (MTCH) for the data 1014, 1014' being downloaded.

Figure 7:
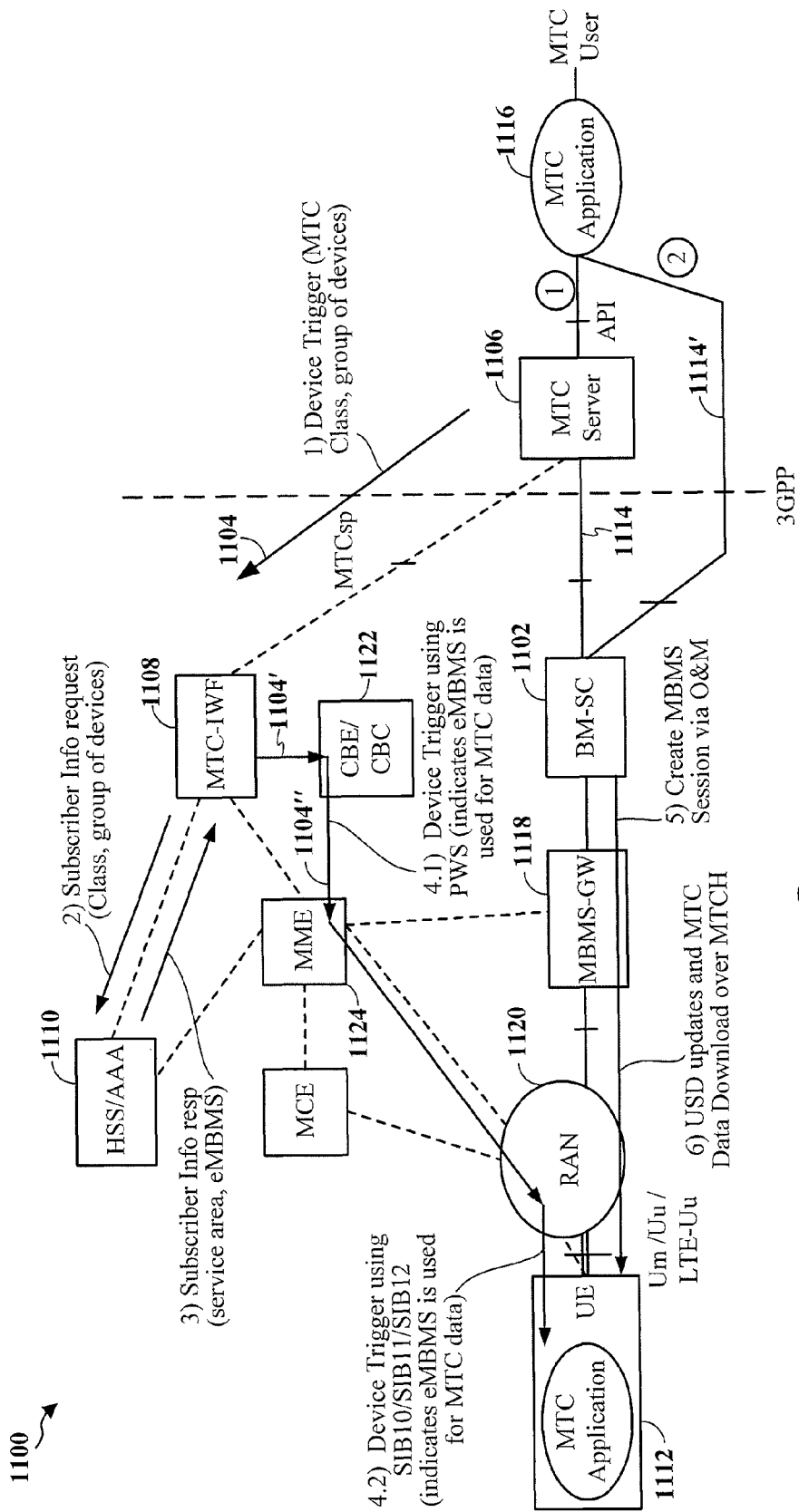
FIG. 7 is a diagram illustrating the first MTC architecture of FIG. 6 using CBS/PWS for UE group indication/triggering.

FIG. 7 is a diagram 1100 illustrating the first MTC architecture of FIG. 6 using CBS/PWS for group indication/triggering. In this multicast/broadcast mechanism, a BM-SC 1102 is used for data downloading. A device trigger 1104 is sent from a MTC server 1106 to a MTC-IWF 1108. The MTC-IWF 1108 requests subscription information from the HSS/AAA 1110 to know where to send and to get mapping information. The HSS/AAA 1110 sends subscription information to the MTC-IWF 1108. The MTC-IWF 1108 sends the device trigger 1104' to the CBE/CBS 1122, which in turn send the device trigger 1104" to a MME 1124, which in turn send the device trigger to a RAN 1120. The device trigger is sent using SIB10, SIB11 or SIB12, or a new SIB, and provides an indication that eMBMS is being used to multicast/broadcast the data. The device trigger using SIB10, SIB11, SIB12, or a new SIB may include group ID information.

Data 1114, 1114' to be downloaded is sent from the MTC server 1106 or MTC application 1116 to the BM-SC 1102. The BM-SC 1102 sends the data 1114, 1114' directly to a MBMS-GW 1118. The MBMS-GW 1118 then sends the data to the RAN 1120. Upon receiving group device trigger, the UEs belonging to the group(s) read USD updates for download information and the MTCH for the data being downloaded.

Figure 8:
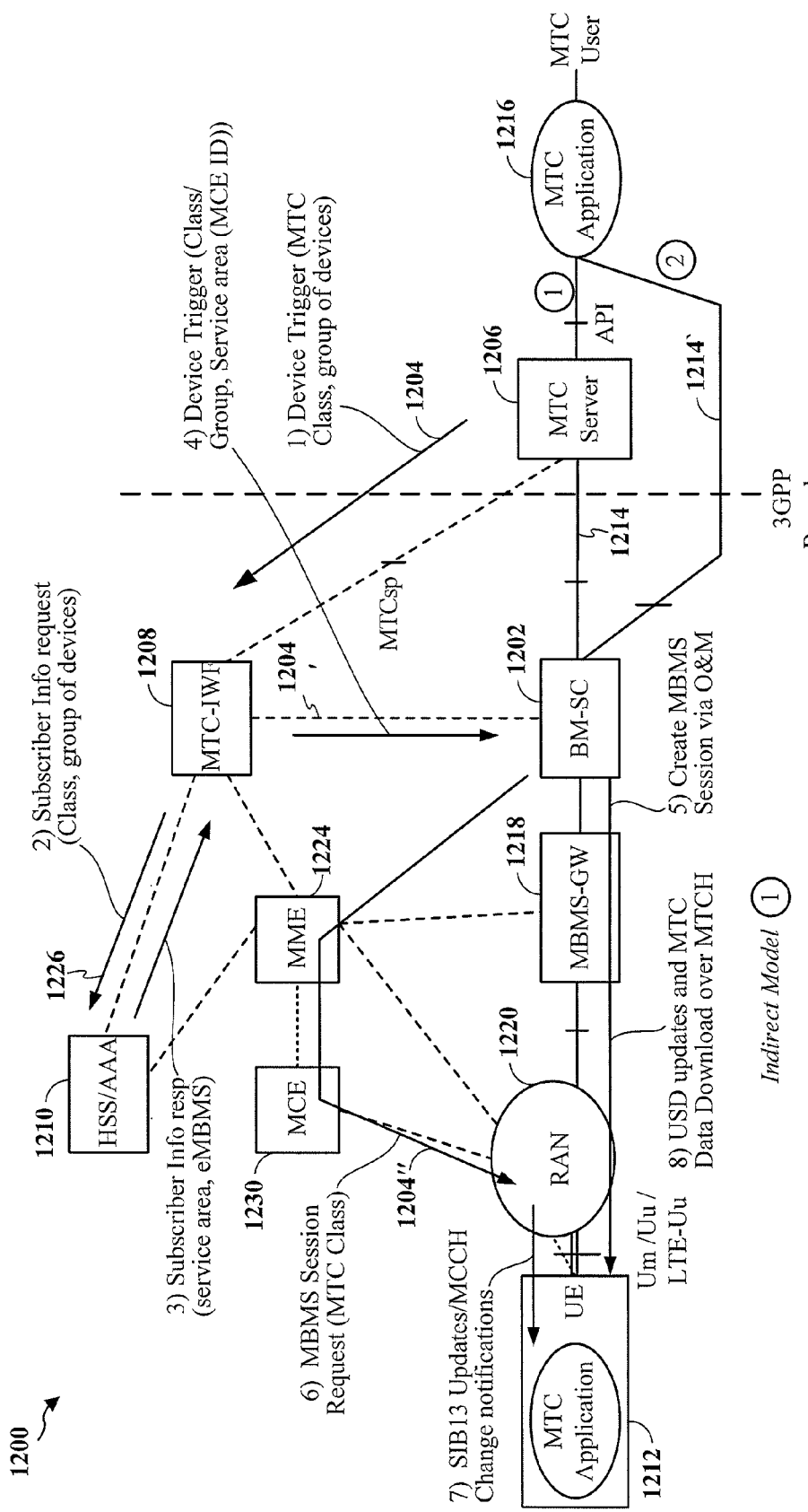
FIG. 8 is a diagram illustrating a second MTC architecture using eMBMS for data/content downloading and for UE group indication/triggering.

FIG. 8 is a diagram 1200 illustrating a second MTC architecture using eMBMS both for data downloading and for group indication/device trigger. In this architecture, eMBMS is used for both device triggering and content downloading, a BM-SC 1202 is used for data downloading and a direct interface between the MTC-IWF 1208 and BM-SC 1202 is used to create MBMS sessions and send device triggers. A device trigger 1204 is sent from a MTC server 1206 to the MTC-IWF 1208 indicating the device trigger and that data intended for UEs associated with a particular data class will be sent. The MTC-IWF 1208 sends a request for subscription information 1226 to the HSS/AAA 1210 to know where to send and to get mapping information. The MTC-IWF 1208 queries with HSS/AAA 1210 to decide that eMBMS should be used as a transport mechanism for the device trigger and MTC data download. The HSS/AAA 1210 sends subscription information 1228 to the MTC-IWF 1208.

The MTC-IWF 1208 sends the device trigger 1204' directly to the BM-SC 1202 and contacts the BM-SC 1202 to request to add a MBMS session with group ID. The BM-SC 1202 creates a MBMS download session. Once the session is created the eMBMS sends the device trigger 1204" to the UEs 1212 through the MME 1224 and MCE 1230 components of the eMBMS and the RAN 1220, while at same time sending the data to the UE 1212 through the MBMS-GW 1218 of the eMBMS. The UEs 1212 wake up to read SIB13, MCCH changes and the USD. After that the data is downloaded over MTCH.

Data 1214, 1214' to be downloaded is sent from the MT server 1206 or MTC application 1216 to the BM-SC 1202. The BM-SC 1202 sends the data directly to the MBMS-GW 1218. The MBMS-GW 1218 then sends the data RAN 1220. The RAN 1220 notifies UEs 1212 within the group of an upcoming data multicast/broadcast, in which case the UEs read USD updates for download information and the MTCH for the data being downloaded.

This architecture may use SIB13 for group device triggering. The SIB13 includes a new DeviceCategory/Group ID and ChangeCount IE. As described above, different DeviceCategory/Group ID values are assigned to different applications/groups. ChangeCount can be used to indicate if a UE needs to check USD because SIB13 change could be because MCCH configuration change. The DeviceCategory/Group ID is also added as a new attribute to the user service description (USD). UEs monitor the USD channel at a period that is configured to minimize battery consumption. UEs monitor for changes to SIB13. When the DeviceCategory/Group ID from the USD is signaled on a new SIB13, the UE does an off-schedule check for USD (schedule fragment) changes. A new SIB change with the same ChangeCount does not cause a new USD check. Alternatively, a CBS/PWS or a unicast trigger can indicate the UE to the use of eMBMS for upcoming data download and may include SDP information in the device trigger.

The schedule fragment for the service associated with the DeviceCategory/Group ID is updated with a schedule for the last minute data transfer. The BM-SC 1202 activates the TMGI for the service session and adds DeviceCategory/Group ID to startMBMS Session. SIB13 is updated to include the DeviceCategory/GroupID from the startMBMS Session signaling. The UEs 1212 are paged when SIB13 is changed to cause the UEs to read the USD. Based on the USD schedule fragment, the UEs tune to MCCH to check if the corresponding TMGI is available and then tune to MTCH to receive data being multicast/broadcast.

FIG. 6, FIG. 7, and FIG. 8 thus represent different multicast/broadcast mechanisms using MBMS/eMBMS. In each, a MTC server serves as a content provider and sends data to a BM-SC at a scheduled time. The UE wakes up periodically, e.g., once a day, for service announcement or user service description (USD) updates. The UE expects to receive data during the time periods described in the schedule description instance of USD. Once the start time indicated in USD is coming, the UE tunes to multicast control channel (MCCH) and pays attention to MCCH change notification.

In unscheduled instances, a device trigger or wakeup indication wakes up the UE. Device triggers may be implemented as one of the following: an existing unicast channel device trigger mechanism (FIG. 6), a CBS/PWS as a group device triggering (FIG. 7) or a SIB13 as group device triggering (device trigger via eMBMS) (FIG. 8). Data class, i.e., group ID, may be included in SIB10, SIB11, SIB12 or SIB13. Device trigger payload indicates eMBMS. One of the device trigger mechanisms specified above can be used to indicate the UE to read USD/MCCH/MTCH. A device trigger may deliver a group specific USD.

For scheduled cases. The MTC server has an agreement with the eMBMS operator regarding the schedule of data downloads and corresponding MTC groups. In these cases the data to be downloaded is sent directly from the MTC server to the BM-SC. The BM-SC has the session schedule and corresponding MTC groups. Once the time to download data is close, the BM-SC sends a session establishment to the MME and MCE through the MBMS-GW.

Similar as CBS/PWS used for data downloading, the set of data sent from the MTC server to MTC-IWF or BM-SC can also include a duration of time T over which the UEs can respond or send an acknowledgement over a unicast connection to the MTC server, if a response is desired. The UEs can stagger their responses during this duration T, so as to distribute the load associated with the unicast accesses of the UEs over that period of time, so that the network does not get congested. The set of data can also include the IP address of an alternate server to which the UEs can communicate with, to attempt a file repair associated with the information received. The MTC server can further attempt to target subgroups of UEs at a time, to prioritize the groups in sequence or MTC server can indicate priority through ARP (AllocationAndRetentionPriority) to the BM-SC so that when the BM-SC sets up MBMS session, it can indicate it to RAN to prioritize different MBMS sessions. For example, in a smart grid case, for a demand response scenario with a request for load shedding, a higher priority group can be targeted first, followed by lower priority groups.

Figure 9:
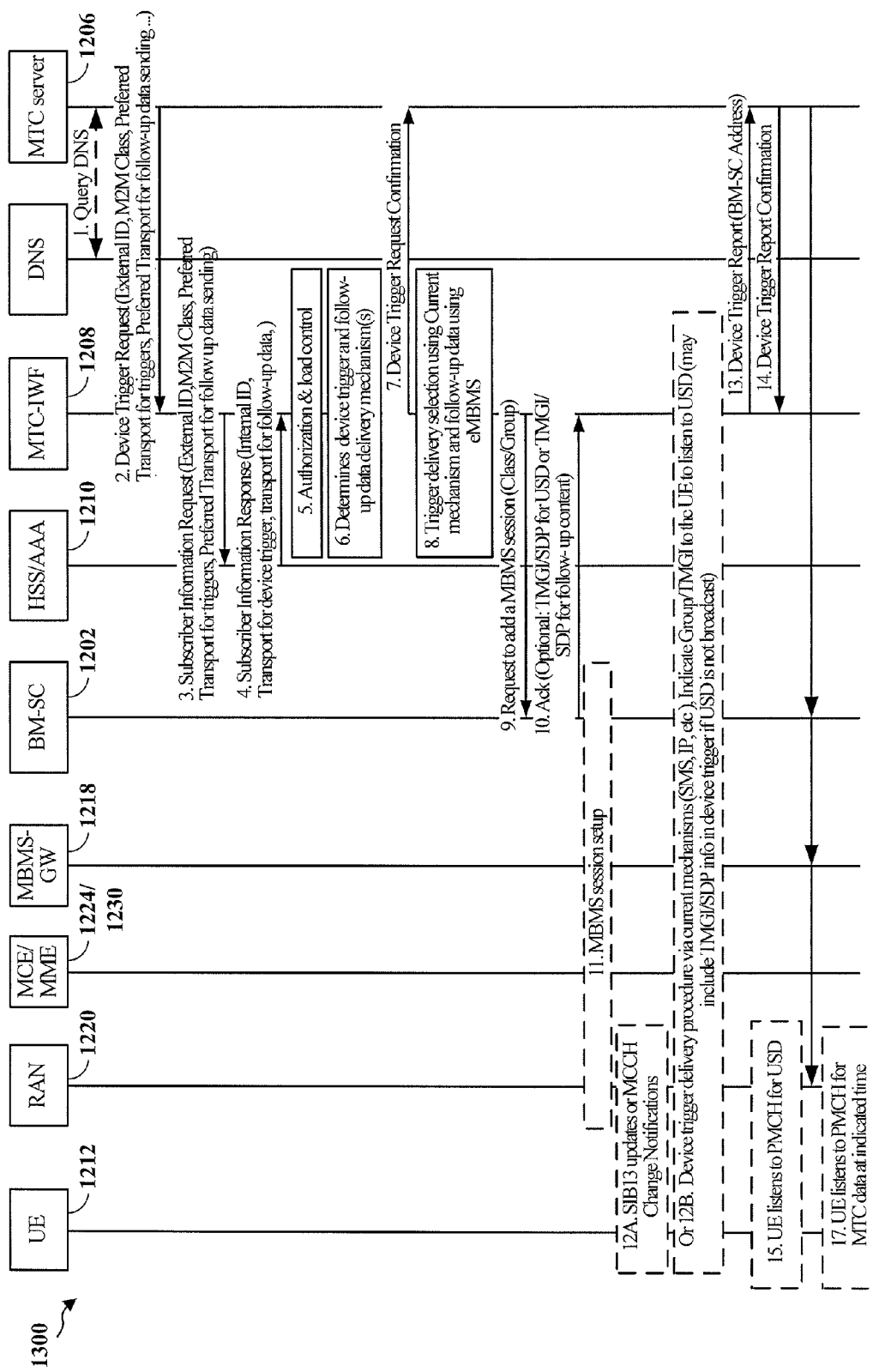
FIG. 9 is a diagram illustrating an exemplary call flow performed by the MTC architecture of FIG. 8.
Figure 10:
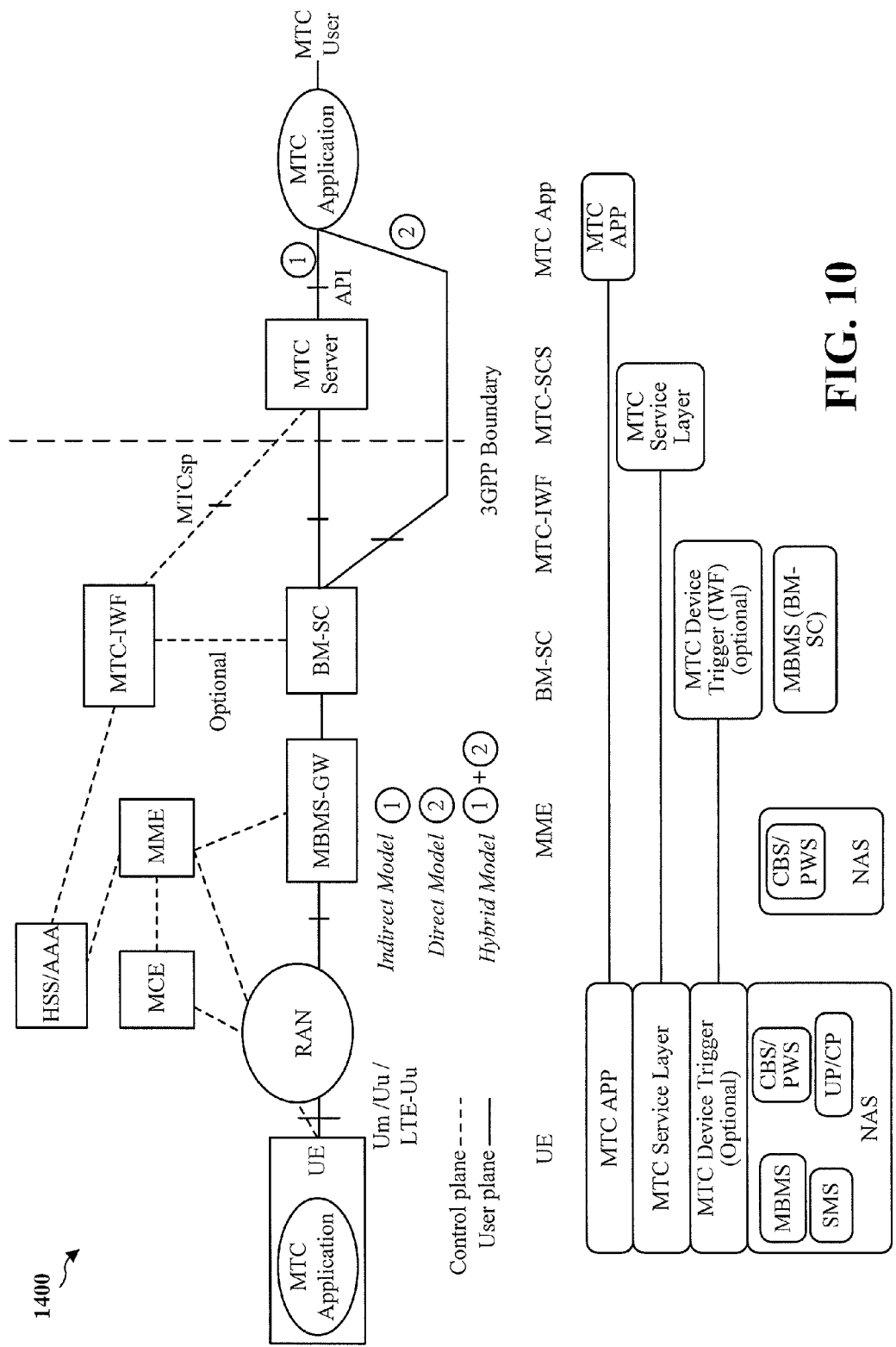
FIG. 10 is a diagram illustrating MTC architecture using eMBMS.

FIG. 9 is a diagram 1300 illustrating an exemplary call flow performed by the MTC architecture of FIG. 8. FIG. 10 is a diagram 1400 illustrating MTC architecture using eMBMS.

In an aspect, an M2M requestor (e.g., an M2M server or entity requesting specific information or action/operation) may need to wake up a number of small M2M devices at or around the same time. For example, this may occur when the M2M requestor requests the devices to upload current measurement data. In another example, a utility company may desire the devices to act on a load shedding demand/response request. Alternatively, the M2M requestor may need to complete a firmware upgrade. The M2M requestor may have a fixed time duration T to complete interactions/operations with the M2M devices.

In order for the M2M requestor to wake up the M2M devices, the M2M requestor may reach out to all devices in a broadcast message and request each device, to randomly distribute device responses over the time duration T. Alternatively, the M2M requestor may reach out to each device individually using unicast messages and stagger communications with the respective devices.

Network communications may vary during the interval T. Thus, it may be desirable to identify an appropriate time interval to communicate with each device. However, link conditions as perceived by each device or network load conditions as perceived by each device, can vary depending on the location of each device. Thus, a device may not be able to communicate at a time determined or suggested by the M2M requestor. However, all communications need to be completed within the available time T. Accordingly, a solution is needed that resolves these issues.

In an aspect, a request for an M2M communication (e.g., firmware upgrade from an external node) may arrive at the M2M requestor at time t. The request may include a delay tolerance T. It is desirable to distribute the available delay tolerance T between the M2M requestor and edge client devices. In particular, it is desirable to provide an additional buffer of time to allow each device to determine communication feasibility.

The M2M requestor estimates a time $\alpha T$ to complete communications with devices where $0 \leq \alpha \leq 1$. The M2M requestor maintains an expected profile of an expected network cost (based on a network load) for M2M communications as a function of time. The M2M requestor identifies the communication time budget $\alpha T$ in an interval $(t, t+T)$ during which communication costs are the lowest, and proceeds to complete device interactions during the interval $\alpha T$. $\alpha T$ may be one contiguous interval. $\alpha T$ may also be a combination of non-contiguous intervals when communication costs are reduced relative to other intervals.

The M2M requestor may maintain one overall communication time budget T to reach devices. The M2M requestor may partition time into two phases, a broadcast phase $\Delta$ followed by a unicast phase $\alpha T-\Delta$. Within time $\Delta$, the M2M requestor attempts to reach all of the M2M devices either as one group or a set of groups. In the remaining time $\alpha T-\Delta$, the M2M requestor attempts to reach each of the devices individually. Based on the expected reachability during the broadcast phases in duration $\Delta$, and an expected time for unicast communications, an appropriate partitioning for $\Delta$ versus $\alpha T-\Delta$ can be chosen.

Broadcast phase time management with communication feasibility determination provisioning will now be discussed. The M2M requestor has broadcast phase time $\Delta$ to communicate with and receive information from N SG client devices (e.g., smart meters). Each M2M client device can complete its interaction with the M2M requestor in time duration $\delta$. Time duration $\delta$ is a combination of an average duration of interaction $\xi$ and an average duration of communication feasibility determination interval $\tau$, i.e., $\delta=\xi+\tau$. The communication feasibility determination interval $\tau$ is provided so that when the client device determines a need to communicate with the requestor, the client device can utilize an additional time $\tau$ to determine when exactly to communicate with the requestor depending on the wireless link quality or network load conditions that the client device perceives. The client device can wait for a suitable time during the time interval $\tau$. When the client device perceives that the dynamic wireless network load is low or when dynamic wireless link quality has improved, the client device may begin interacting with the M2M requestor.

Given the communication feasibility time determination flexibility, a number of solution variants may be provided. In a first solution, the M2M requestor provides an entire time $\Delta$ to the N SG client devices and allows the client devices to randomize their time intervals $\delta=\xi+\tau$ within time $\Delta$ such that $N\delta\leq\Delta$. In a second solution, the M2M requestor communicates with each device sequentially, interacting with each device over duration $\delta$ such that $N\delta\leq\Delta$. If k devices can access wireless resources concurrently, then $\delta\rightarrow(\delta/k)$.

Subgroup-based broadcast phase time management will now be discussed. In subgroup-based time management, the M2M requestor interacts sequentially with device subgroups G. The M2M requestor allocates time i for subgroup Gi such that $\tau\Delta i\leq\Delta$. The M2M requestor provides an entire time $\Delta i$ to the Ni SG client devices in subgroup Gi, and allows the client devices to randomize their duration of interaction $\delta$ such that $Ni\delta\leq\Delta i$. If k devices can access wireless resources concurrently, then $\delta\rightarrow(\delta/k)$.

Dynamic subgroup-based broadcast phase time management will now be discussed. If $\Delta-\Sigma\Delta i>0$, then the M2M requestor can iteratively apply a procedure to reach remaining devices that have not yet responded. The M2M requestor can form new dynamic subgroups over the remaining devices, and apply the procedure across remaining devices using $\Delta\rightarrow(\Delta-\Sigma\Delta i)$.

Communication consolidation will now be discussed. After the broadcast phase is completed, the M2M requestor switches over to a unicast phase duration. The M2M requestor utilizes time $(\Delta T-\Delta)$ to reach out to the remaining devices via unicast communications.

In an aspect, based on the actual costs of communications during the interval (t, t+T), the M2M requestor may refine a communication cost model as a function of time. Future prediction of expected costs may be based on the dynamic learning of costs. If an actual cost of communications or an operator-suggested load profile is available, then the M2M requestor may utilize this information instead of using a learned model of costs.

In the simple case of an M2M requestor communicating with a single M2M device, the M2M requestor may provide a duration of flexibility of communication determination to the M2M client device. This provides flexibility for the device to communicate with the M2M requestor based on dynamic network load or link conditions.

In an aspect, the M2M requestor may plan for a communication time determination phase for each device. Thus, the M2M requestor has to budget more time for each device to determine when to transmit if network conditions vary. This resolves issues with cellular platforms that may need to adhere to operator constraints not visible to the M2M requestor, where the operator constraints or dynamic network conditions may restrict the device ability to transmit. The solution provides the devices with a window of extra time to determine when to transmit based on the network conditions to adhere to the operator/network. If needed, the solution may be iterative such that the process repeats for a fraction of the devices that are not reached during a first iteration of the process.

Device transmissions may be randomized. A device may determine the time to transmit based on a given random process. However, in accordance with the disclosure, the device may not transmit immediately after the determination. Instead, the device may wait (for a period of time) to monitor network conditions and then transmit at a later time when the device perceives a good opportunity to transmit. The determination may be based on constraints observed on the wireless link and/or based on policies imposed by the network operator. In an aspect, the device may not be allowed to transmit due to such constraints. Consequently, the requestor may attempt to receive a transmission from the device at a later time.

If a broadcast request has a high/emergency priority, then the device may choose to transmit a response to the high/emergency priority message despite network constraints and/or operator policies as the device reaches an end of the time budget. The network policies may be designed to allow a high priority transmission if the device has attempted to adhere to the network for as long as possible and the device has no choice but to transmit as the end of the time budget nears.

An overall time may be budgeted across all devices or groups of devices to include transmission delays to accomplish a task. A device may receive an additional budgeted time in a broadcast message, and attempt a transmission during the time received from the M2M requestor if the device meets operator/network constraints. If not possible to do so, the device may abort the transmission.

In an aspect, a tolerable delay (e.g., delay in terms of minutes, hours, days, etc.) may be exploited in terms of allocating an overall tolerable delay budget to help a device avoid congestion and still be able to react to urgent messages. The M2M requestor may be aware of the overall tolerable delay budget and inform devices, for which a response is expected, that the devices have an overall tolerable delay budget for responding. Also, the M2M requestor may inform the devices to perform a given randomization process (load spread) over a given time window. Individual devices are then able to make a network-friendly decision on how/when to use resources for transmission. For example, the device may decide to send a response to the M2M requestor by piggy-backing on a connection that was brought up for a reason other than for responding to the M2M requestor. Optionally, the device may consume an allocated fraction of the delay budget and randomize uniformly over a given time window while considering a minimum wait delay time and/or a maximum wait delay time indicated by the M2M requestor. The M2M requestor may split the overall tolerable delay budget into different partitions for subsequent hops (Device→Concentrator→M2M Requestor).

Figure 11:
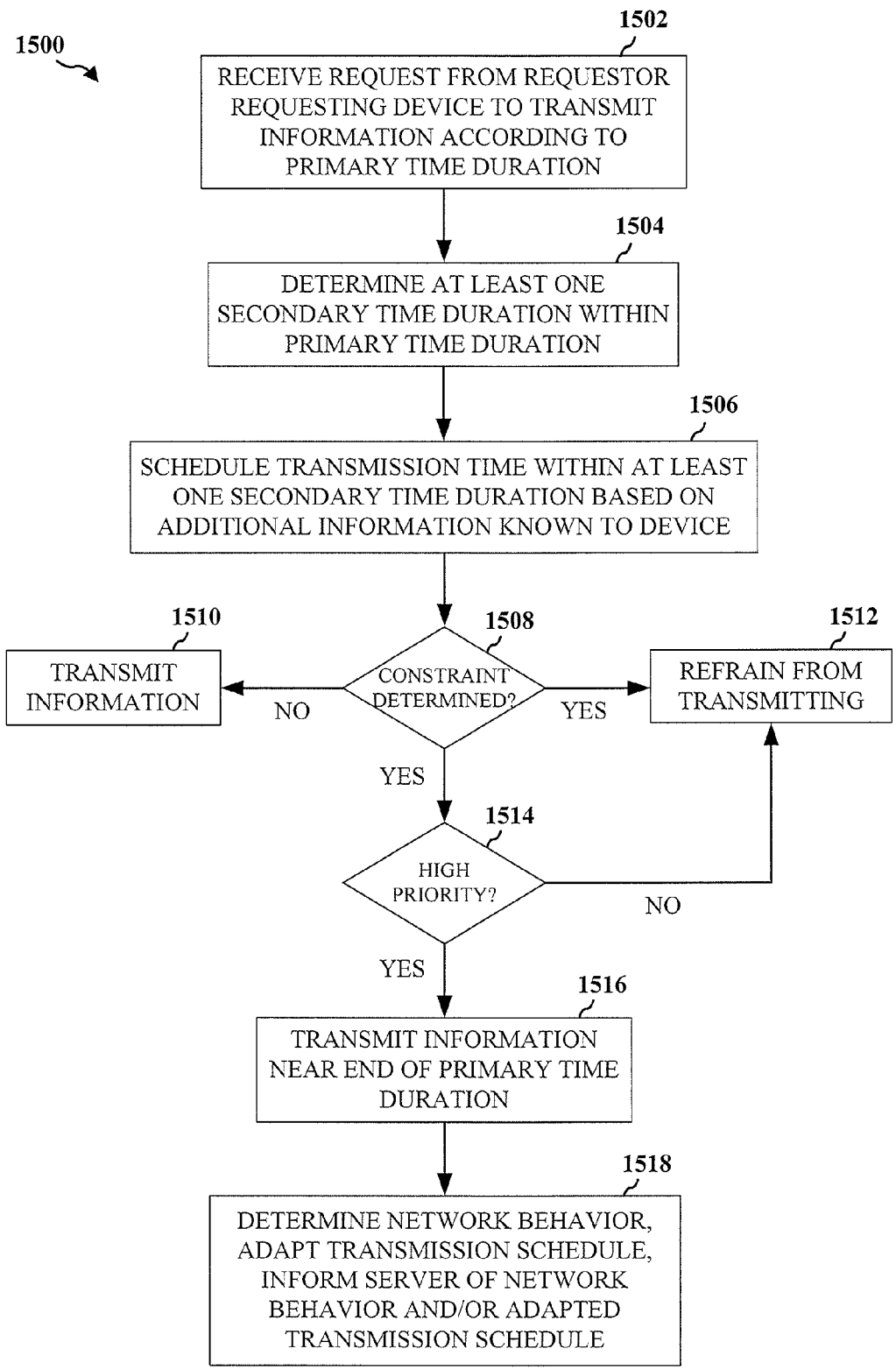
FIG. 11 is a flow chart of a method of wireless communication involving a multicast/broadcast mechanism.

FIG. 11 is a flow chart 1500 of a method of wireless communication. The method may be performed by a device (e.g., UE). At block 1502, the device receives a request from a requestor (e.g., a server or entity requesting specific information or action/operation). The request requests the device to transmit information to the requestor according to a primary time duration. In one example, the request for information may be a request for data the requestor wishes to receive. In other examples, the request for information may be a request for a result of an operation the requestor wishes to trigger, confirmation of an action the requestor wishes to be performed in response to the request, and/or other types of information, and is not limited to a request for a data transmission. The primary time duration may be a set of one or more non-contiguous time intervals. The request may further request the device to perform a randomization process for determining a transmission time.

At block 1504, the device determines one or more secondary time durations within the primary time duration for transmitting the information to the requestor. Determining the one or more secondary time durations may be based on the randomization process requested by the requestor.

At block 1506, the device schedules the transmission time within the one or more secondary time durations to transmit the information to the requestor in response to the request. The scheduling may be based on additional information known to the device. The additional information may include a network condition, a device condition, and/or a network operator policy, for example. The device condition may be related to device power consumption or a device wake-up schedule, for example.

At block 1508, the device determines whether a constraint exists for transmitting the information during the primary time duration. The determination may be based on the additional information known to the device. At block 1510, when the device determines an absence of the constraint, the device transmits the information during the primary time duration to the requestor.

At block 1512, in one aspect, when the device determines an existence of the constraint, the device refrains from transmitting the information during the primary time duration. At block 1514, in another aspect, when the device determines the existence of the constraint, the device may further determine whether the request to transmit (received from the requestor) is a high priority request. If the request is not a high priority request, the device proceeds to block 1512 and refrains from transmitting the information during the primary time duration.

However, if the request is a high priority request, the device waits to transmit the information until near an end of the primary time duration. At block 1516, the device transmits the information near the end of the primary time duration.

At block 1518, the device may determine a network behavior, such as a dynamic load and/or a link condition, to improve (e.g., make more efficient) transmission scheduling. Accordingly, the device may adapt the scheduling to transmit the information based on the determined network behavior. The device may then inform the requestor of the adapted scheduling and/or the determined network behavior.

Figure 12:
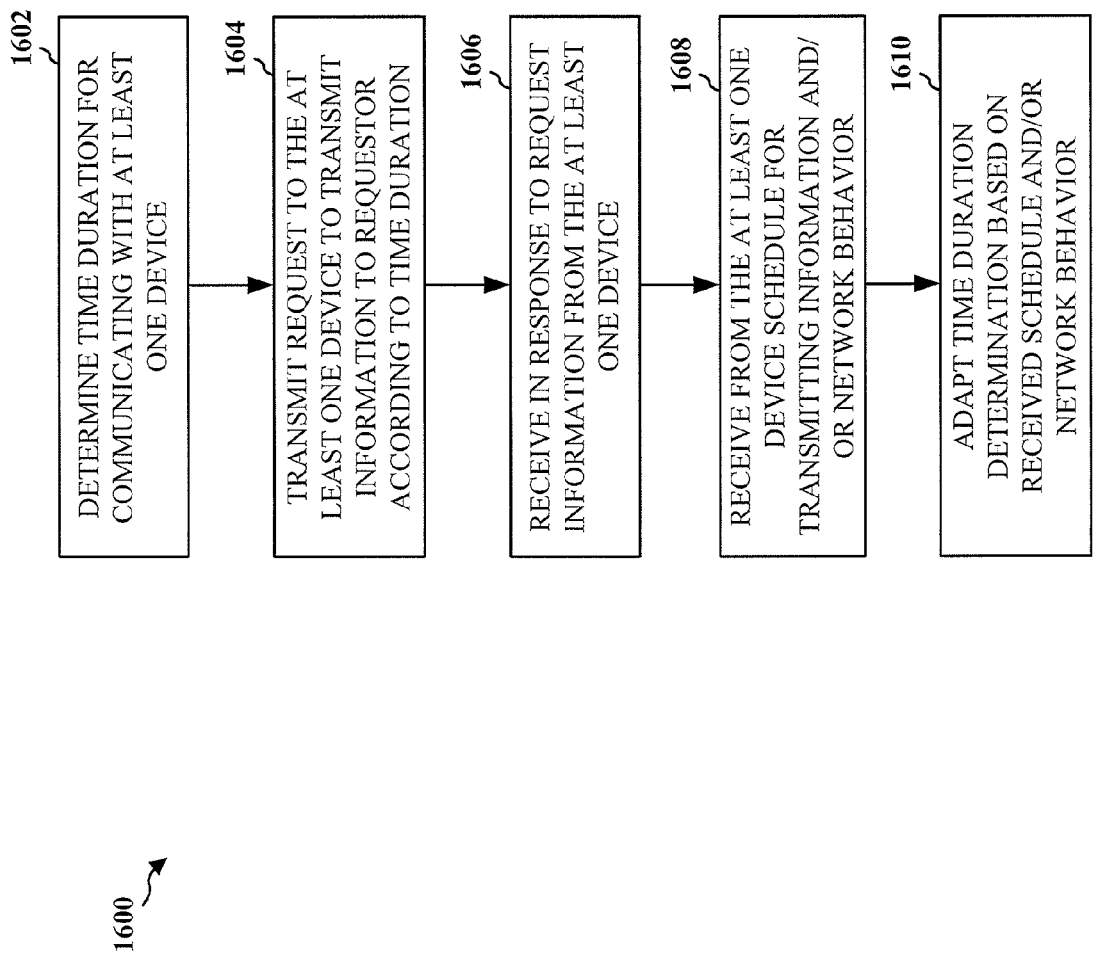
FIG. 12 is a flow chart of a method of wireless communication involving a multicast/broadcast mechanism.

FIG. 12 is a flow chart 1600 of a method of wireless communication. The method may be performed by a requestor (e.g., MTC server, base station, entity requesting specific information or action/operation, etc.). At block 1602, the requestor determines a time duration for communicating with one or more devices. The time duration may be determined based on a communication cost, a network condition, and/or a network operator policy, for example. The time duration may be a set of one or more non-contiguous time intervals.

At block 1604, the requestor transmits a request to the one or more devices to transmit information to the requestor according to the time duration. In one example, the request for information may be a request for data the requestor wishes to receive. In other examples, the request for information may be a request for a result of an operation the requestor wishes to trigger, confirmation of an action the requestor wishes to be performed in response to the request, and/or other types of information, and is not limited to a request for a data transmission. The request may be transmitted via a unicast message and/or a multicast message. The request may further request the one or more devices to perform a randomization process for determining a transmission time within the time duration. The request may also indicate a minimum wait time and a maximum wait time for transmitting the information within the time duration. At block 1606, the requestor receives in response to the request the information from the one or more devices within the time duration.

In an aspect, the requestor may receive feedback from the one or more devices to improve (e.g., make more efficient) the time duration determination. Accordingly, at block 1608, the requestor may receive from the one or more devices a schedule for transmitting the information and/or a network behavior (e.g., dynamic load, link condition, etc.) determined at a respective device. Thereafter, at block 1610, the requestor may adapt the time duration determination based on the received schedule and/or the determined network behavior.

Figure 13:
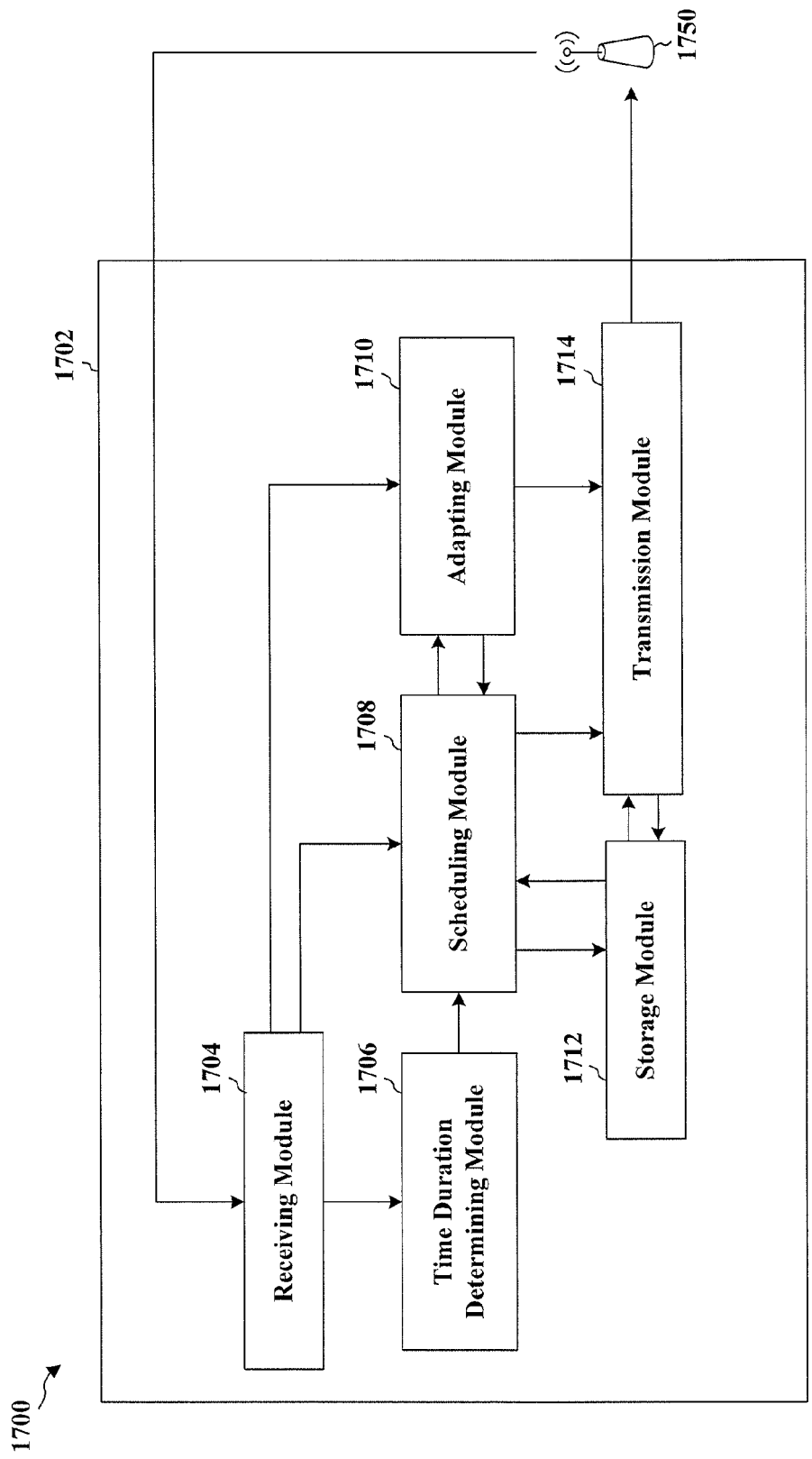
FIG. 13 is a conceptual data flow diagram illustrating the data flow between different modules/means/components in an exemplary apparatus.

FIG. 13 is a conceptual data flow diagram 1700 illustrating the data flow between different modules/means/components in an exemplary apparatus 1702. The apparatus may be a device (e.g., UE). The apparatus includes a receiving module 1704, a time duration determining module 1706, a scheduling module 1708, an adapting module 1710, a storage module 1712, and a transmission module 1714.

The receiving module 1704 receives a request from a requestor (via base station 1750). The request requests the apparatus 1702 to transmit information to the requestor according to a primary time duration. In one example, the request for information may be a request for data the requestor wishes to receive. In other examples, the request for information may be a request for a result of an operation the requestor wishes to trigger, confirmation of an action the requestor wishes to be performed in response to the request, and/or other types of information, and is not limited to a request for a data transmission. The primary time duration may be a set of one or more non-contiguous time intervals. The request may further request the apparatus 1702 to perform a randomization process for determining a transmission time.

The time duration determining module 1706 determines one or more secondary time durations within the primary time duration for transmitting the information to the requestor. Determining the one or more secondary time durations may be based on the randomization process requested by the requestor.

The scheduling module 1708 schedules the transmission time within the one or more secondary time durations to transmit the information to the requestor in response to the request. The scheduling may be based on additional information known to the apparatus 1702. For example, the additional information may be stored in the storage module 1712. The additional information may include a network condition, a device condition, and/or a network operator policy, for example. The device condition may be related to device power consumption or a device wake-up schedule, for example.

The scheduling module 1708 determines whether a constraint exists for transmitting the information during the primary time duration. The determination may be based on the additional information known to the apparatus 1702. When the scheduling module 1708 determines an absence of the constraint, the scheduling module 1708 transmits (via the transmission module 1714) the information during the primary time duration to the requestor (via the base station 1750).

In one aspect, when the scheduling module 1708 determines an existence of the constraint, the scheduling module 1708 refrains from transmitting the information during the primary time duration. In another aspect, when the scheduling module 1708 determines the existence of the constraint, the scheduling module 1708 may further determine whether the request to transmit (received from the requestor) is a high priority request. If the request is not a high priority request, the scheduling module 1708 refrains from transmitting the information during the primary time duration.

However, if the request is a high priority request, the scheduling module 1708 waits to transmit the information until near an end of the primary time duration. The scheduling module 1708 then transmits (via the transmission module 1714) the information near the end of the primary time duration.

The adapting module 1708 may determine a network behavior, such as a dynamic load and/or a link condition, to improve (e.g., make more efficient) transmission scheduling. Accordingly, the adapting module 1708 may adapt the scheduling to transmit the information based on the determined network behavior. The adapting module 1708 may then inform (via the transmission module 1714) the requestor of the adapted scheduling and/or the determined network behavior.

The apparatus may include additional modules that perform each of the blocks of the algorithm in the aforementioned flow chart of FIG. 11. As such, each block in the aforementioned flow chart of FIG. 11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 14:
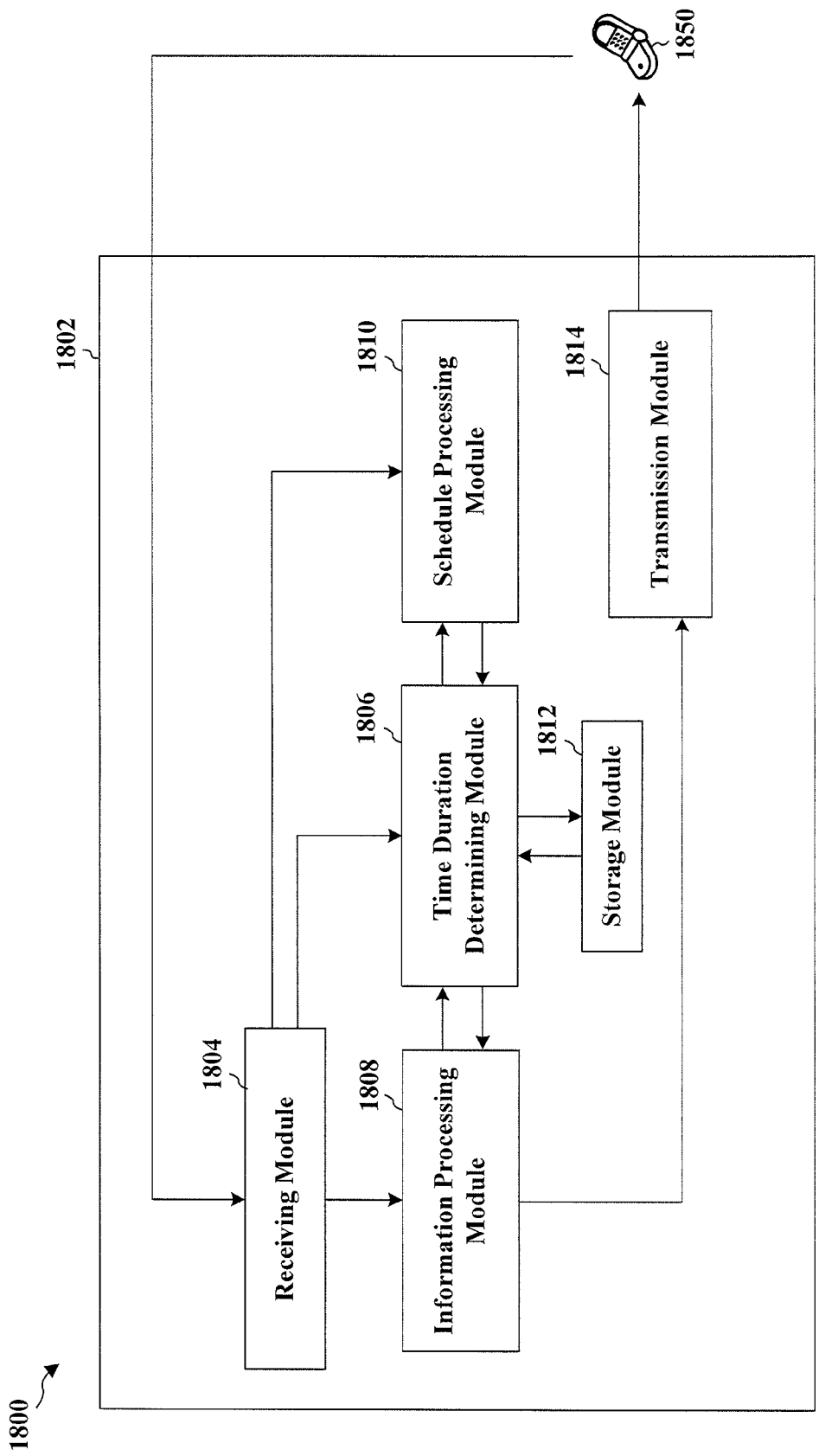
FIG. 14 is a conceptual data flow diagram illustrating the data flow between different modules/means/components in an exemplary apparatus.

FIG. 14 is a conceptual data flow diagram 1800 illustrating the data flow between different modules/means/components in an exemplary apparatus 1802. The apparatus may be a requestor (e.g., MTC server, base station, entity requesting specific information or action/operation, etc.). The apparatus includes a receiving module 1804, a time duration determining module 1806, an information processing module 1808, a schedule processing module 1810, a storage module 1812, and a transmission module 1814.

The time duration determining module 1806 determines a time duration for communicating with one or more devices 1850. The time duration may be determined based on a communication cost, a network condition, and/or a network operator policy known to the apparatus 1802 and stored in the storage module 1812, for example. The time duration may be a set of one or more non-contiguous time intervals.

The information processing module 1808 transmits (via the transmission module 1814) a request to the one or more devices 1850 to transmit information to the apparatus 1802 according to the time duration. In one example, the request for information may be a request for data the apparatus 1802 wishes to receive. In other examples, the request for information may be a request for a result of an operation the apparatus 1802 wishes to trigger, confirmation of an action the apparatus 1802 wishes to be performed in response to the request, and/or other types of information, and is not limited to a request for a data transmission. The request may be transmitted via a unicast message and/or a multicast message. The request may further request the one or more devices 1850 to perform a randomization process for determining a transmission time within the time duration. The request may also indicate a minimum wait time and a maximum wait time for transmitting the information within the time duration. The information processing module 1808 receives in response to the request the information from the one or more devices 1850 within the time duration.

In an aspect, the apparatus 1802 may receive feedback from the one or more devices 1850 to improve (e.g., make more efficient) the time duration determination. Accordingly, the schedule processing module 1810 may receive from the one or more devices 1850 a schedule for transmitting the information and/or a network behavior (e.g., dynamic load, link condition, etc.) determined at a respective device. Thereafter, the time duration determining module 1806 may adapt the time duration determination based on the received schedule and/or the determined network behavior.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 15:
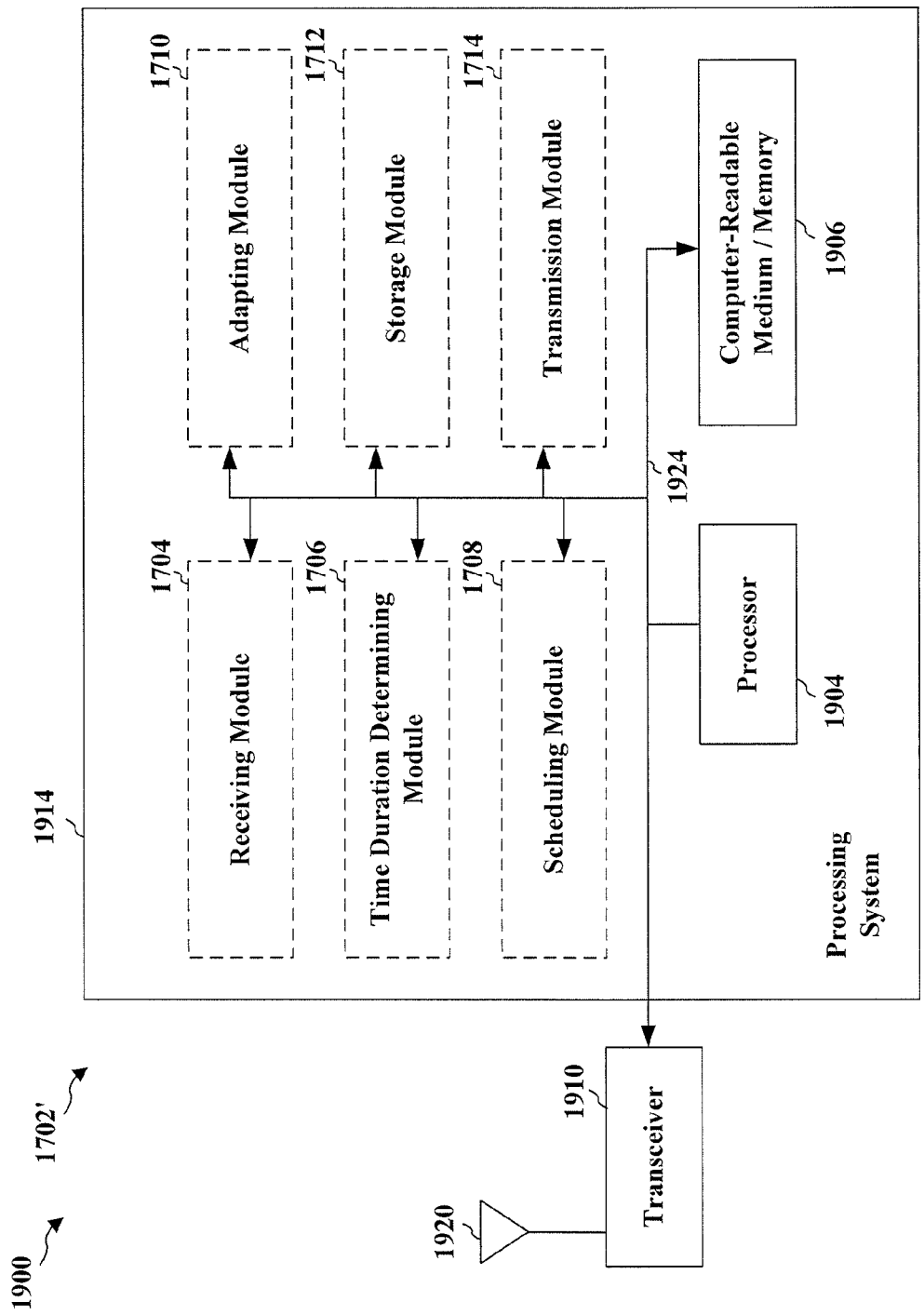
FIG. 15 is a diagram illustrating an example of a hardware implementation for an apparatus employing a processing system.

FIG. 15 is a diagram 1900 illustrating an example of a hardware implementation for an apparatus 1702' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware modules, represented by the processor 1904, the modules 1704, 1706, 1708, 1710, 1712, 1714 and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the receiving module 1704. In addition, the transceiver 1910 receives information from the processing system 1914, specifically the transmission module 1714, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system further includes at least one of the modules 1704, 1706, 1708, 1710, 1712, and 1714. The modules may be software modules running in the processor 1904, resident/stored in the computer readable medium/memory 1906, one or more hardware modules coupled to the processor 1904, or some combination thereof. The processing system 1914 may be a component of the UE 350 and may include the memory 360 and/or at least one of the TX processor 368, the RX processor 356, and the controller/processor 359.

In one configuration, the apparatus 1702/1702' for wireless communication includes means for receiving a request from a requestor, the request requesting the device to transmit information to the requestor according to a primary time duration; means for determining at least one secondary time duration within the primary time duration for transmitting the information to the requestor; means for scheduling a transmission time within the at least one secondary time duration to transmit the information to the requestor in response to the request, the scheduling based on additional information known to the device; means for transmitting the information during the primary time duration to the requestor based on the absence of a constraint; means for refraining from transmitting the information during the primary time duration based on the constraint; means for waiting to transmit the information until near an end of the primary time duration; means for transmitting the information near the end of the primary time duration; means for determining a network behavior; means for adapting the scheduling to transmit the information based on the determined network behavior; and means for informing the requestor of the adapted scheduling.

The aforementioned means may be one or more of the aforementioned modules of the apparatus 1702 and/or the processing system 1914 of the apparatus 1702' configured to perform the functions recited by the aforementioned means. As described supra, the processing system 1914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 16:
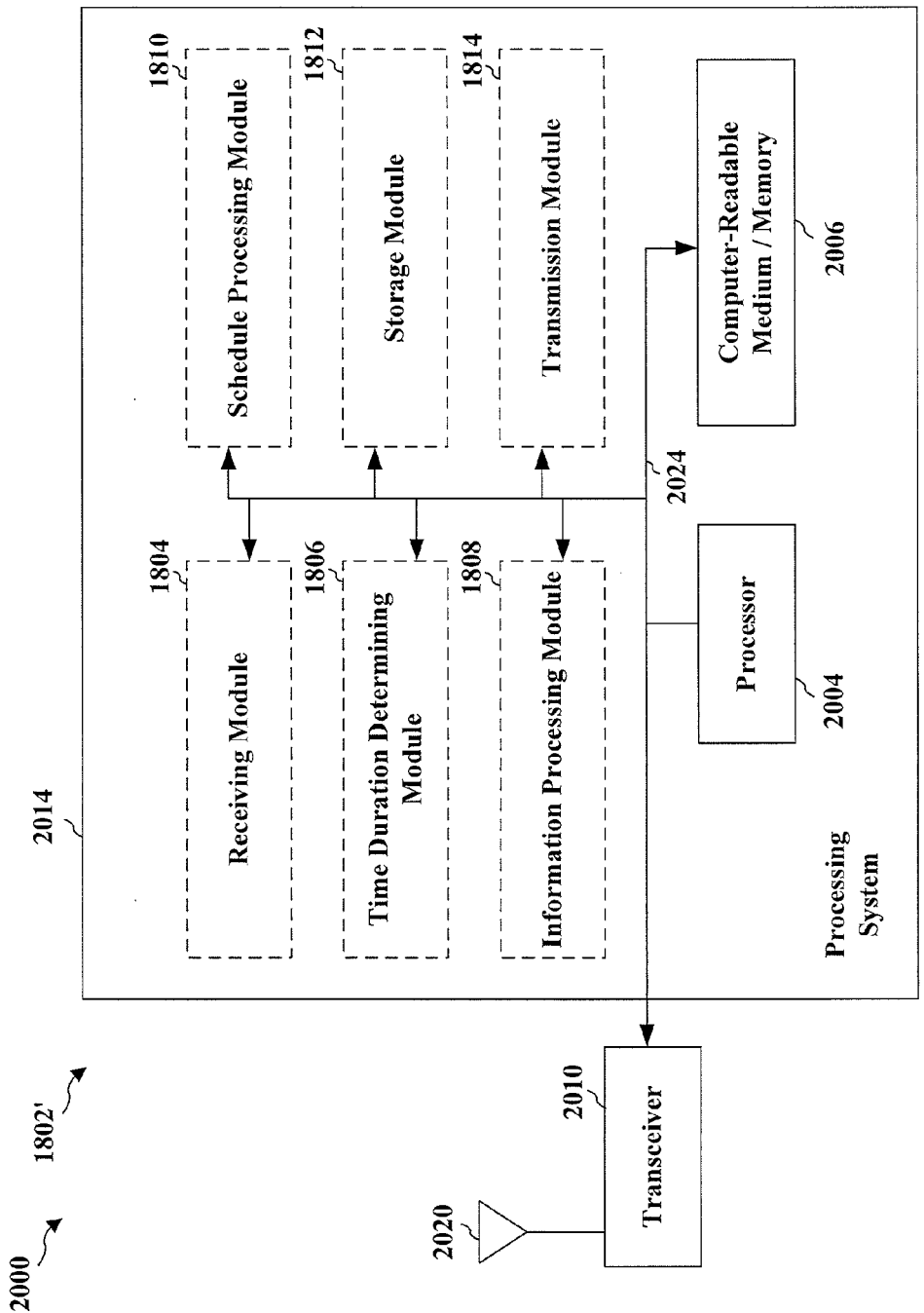
FIG. 16 is a diagram illustrating an example of a hardware implementation for an apparatus employing a processing system.

FIG. 16 is a diagram 2000 illustrating an example of a hardware implementation for an apparatus 1802' employing a processing system 2014. The processing system 2014 may be implemented with a bus architecture, represented generally by the bus 2024. The bus 2024 may include any number of interconnecting buses and bridges depending on the specific application of the processing system 2014 and the overall design constraints. The bus 2024 links together various circuits including one or more processors and/or hardware modules, represented by the processor 2004, the modules 1804, 1806, 1808, 1810, 1812, 1814, and the computer-readable medium/memory 2006. The bus 2024 may also link various other circuits such as timing sources, peripherals, voltage regulators, and power management circuits, which are well known in the art, and therefore, will not be described any further.

The processing system 2014 may be coupled to a transceiver 2010. The transceiver 2010 is coupled to one or more antennas 2020. The transceiver 2010 provides a means for communicating with various other apparatus over a transmission medium. The transceiver 2010 receives a signal from the one or more antennas 2020, extracts information from the received signal, and provides the extracted information to the processing system 2014, specifically the receiving module 1804. In addition, the transceiver 2010 receives information from the processing system 2014, specifically the transmission module 1814, and based on the received information, generates a signal to be applied to the one or more antennas 2020. The processing system 2014 includes a processor 2004 coupled to a computer-readable medium/memory 2006. The processor 2004 is responsible for general processing, including the execution of software stored on the computer-readable medium/memory 2006. The software, when executed by the processor 2004, causes the processing system 2014 to perform the various functions described supra for any particular apparatus. The computer-readable medium/memory 2006 may also be used for storing data that is manipulated by the processor 2004 when executing software. The processing system further includes at least one of the modules 1804, 1806, 1808, 1810, 1812, and 1814. The modules may be software modules running in the processor 2004, resident/stored in the computer readable medium/memory 2006, one or more hardware modules coupled to the processor 2004, or some combination thereof. The processing system 2014 may be a component of the eNB 310 and may include the memory 376 and/or at least one of the TX processor 316, the RX processor 370, and the controller/processor 375.

In one configuration, the apparatus 1802/1802' for wireless communication includes means for determining a time duration for communicating with at least one device; means for transmitting a request to the at least one device to transmit information to the requestor according to the time duration; means for receiving in response to the request the information from the at least one device within the time duration; means for receiving from the at least one device a schedule for transmitting the information; and means for adapting the time duration determination based on the received schedule.

The aforementioned means may be one or more of the aforementioned modules of the apparatus 1802 and/or the processing system 2014 of the apparatus 1802' configured to perform the functions recited by the aforementioned means. As described supra, the processing system 2014 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes disclosed is an illustration of exemplary approaches. Based upon design preferences, it is understood that the specific order or hierarchy of blocks in the processes may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a device, comprising:
    receiving a request from a requestor, the request requesting the device to transmit information to the requestor according to a primary time duration;
    determining at least one secondary time duration within the primary time duration for transmitting the information to the requestor;
    scheduling, during a communication feasibility determination interval of the at least one secondary time duration, a transmission time within the at least one secondary time duration to transmit the information to the requestor in response to the request, the scheduling based on additional information known to the device, wherein scheduling the transmission time includes:
        determining, during the communication feasibility determination interval, a network behavior including at least one of a network load or a communication link condition;
    adapting the scheduling of the transmission time to transmit the information to the requestor based on the determined network behavior; and
    transmitting the scheduled transmission time to the requestor.

2. The method of claim 1, wherein the request further requests the device to perform a randomization process for determining the transmission time.

3. The method of claim 2, wherein the determining the at least one secondary time duration is based on the randomization process requested by the requestor.

4. The method of claim 1, wherein the additional information comprises at least one of a device condition or a network operator policy.

5. The method of claim 4, wherein the device condition comprises at least one of device power consumption or device wake-up schedule.

6. The method of claim 1, wherein the primary time duration comprises a set of one or more non-contiguous time intervals.

7. The method of claim 1, wherein the scheduling comprises determining an absence of a constraint to transmit the information during the primary time duration based on the additional information known to the device, the method further comprising:
    transmitting the information during the primary time duration to the requestor based on the absence of the constraint.

8. The method of claim 1, wherein the scheduling comprises determining a constraint to transmit the information during the primary time duration based on the additional information known to the device, the method further comprising:
    refraining from transmitting the information during the primary time duration based on the constraint.

9. The method of claim 1, wherein the request is a high priority request and the scheduling comprises determining a constraint to transmit the information during the primary time duration based on the additional information known to the device, the method further comprising:
    waiting to transmit the information until near an end of the primary time duration; and
    transmitting the information near the end of the primary time duration.

10. The method of claim 1, wherein the request comprises a minimum wait time and a maximum wait time for transmitting the information within the primary time duration, and wherein the at least one secondary time duration is determined based on the minimum wait time and the maximum wait time.

11. The method of claim 1,
    wherein the network behavior includes at least one of a network load or a communication link condition.

12. The method of claim 1,
    wherein transmitting includes transmitting at least one of the determined network behavior or the transmission time.

13. The method of claim 1, wherein the secondary time duration includes the communication feasibility determination interval and a requestor interaction duration for transmitting the information to the requestor.

14. A method of wireless communication at a requestor, the requestor being a machine-to-machine service entity, comprising:
    receiving an indication for transmitting a plurality of messages to a plurality of machine-to-machine communication devices;
    determining a time duration for communicating with the plurality of machine-to-machine communication devices;
    transmitting at least one of the plurality of messages to obtain information associated with the time duration to at least one of the plurality of machine-to-machine communication devices;
    receiving, from the at least one of the plurality of machine-to-machine communication devices, a transmission time scheduled by the at least one of the plurality of machine-to-machine communication devices based on a network behavior detected by the at least one of the plurality of machine-to-machine communication devices;

determining a schedule including the transmission time within the time duration for communication with the plurality of machine-to-machine communication devices and communicating with the at least one of the plurality of machine-to-machine communication devices according to the schedule.

15. The method of claim 14, wherein the plurality of messages include a request, wherein the request further requests the plurality of machine-to-machine communication devices to perform a randomization process for determining the transmission time within the time duration.

16. The method of claim 14, wherein the plurality of messages include a request, wherein the request comprises a minimum wait time and a maximum wait time for transmitting the information within the time duration.

17. The method of claim 14, wherein the time duration is determined based on at least one of:
   a communication cost;
   a network condition; or
   a network operator policy.

18. The method of claim 14, wherein the plurality of messages include a request, wherein the request is transmitted via at least one of a unicast message or a multicast message.

19. The method of claim 14, wherein the time duration comprises a set of one or more non-contiguous time intervals.

20. A device for wireless communication, comprising:
   means for receiving a request from a requestor, the request requesting the device to transmit information to the requestor according to a primary time duration;
   means for determining at least one secondary time duration within the primary time duration for transmitting the information to the requestor;
   means for scheduling, during a communication feasibility determination interval of the at least one secondary time duration, a transmission time within the at least one secondary time duration to transmit the information to the requestor in response to the request, the scheduling based on additional information known to the device, wherein the means for scheduling the transmission time include:
   means for determining, during the communication feasibility determination interval, a network behavior including at least one of a network load or a communication link condition;
   means for adapting the scheduling of the transmission time to transmit the information to the requestor based on the determined network behavior; and
   means for transmitting the scheduled transmission time to the requestor.

21. The device of claim 20, wherein the request further requests the device to perform a randomization process for determining the transmission time.

22. The device of claim 21, wherein the means for determining is configured to determine the at least one secondary time duration based on the randomization process requested by the requestor.

23. The device of claim 20, wherein the additional information comprises at least one of a device condition or a network operator policy.

24. The device of claim 23, wherein the device condition comprises at least one of device power consumption or device wake-up schedule.

25. The device of claim 20, wherein the primary time duration comprises a set of one or more non-contiguous time intervals.

26. The device of claim 20, wherein the means for scheduling is configured to determine an absence of a constraint to transmit the information during the primary time duration based on the additional information known to the device, the device further comprising:
   means for transmitting the information during the primary time duration to the requestor based on the absence of the constraint.

27. The device of claim 20, wherein the means for scheduling is configured to determine a constraint to transmit the information during the primary time duration based on the additional information known to the device, the device further comprising:
   means for refraining from transmitting the information during the primary time duration based on the constraint.

28. The device of claim 20, wherein the request is a high priority request and the means for scheduling is configured to determine a constraint to transmit the information during the primary time duration based on the additional information known to the device, the device further comprising:
   means for waiting to transmit the information until near an end of the primary time duration; and
   means for transmitting the information near the end of the primary time duration.

29. The device of claim 20, wherein the request comprises a minimum wait time and a maximum wait time for transmitting the information within the primary time duration, and wherein the means for determining is configured to determine the at least one secondary time duration based on the minimum wait time and the maximum wait time.

30. The device of claim 20,
   wherein the network behavior includes at least one of a network load or a communication link condition.

31. The device of claim 20,
   wherein the means for transmitting include transmitting at least one of the determined network behavior or the transmission time.

32. A requestor for wireless communication, the requestor being a machine-to-machine service entity, comprising:
   means for receiving an indication for transmitting a plurality of messages to a plurality of machine-to-machine communication devices;
   means for determining a time duration for communicating with the plurality of machine-to-machine communication devices;
   means for transmitting at least one of the plurality of messages to obtain information associated with the time duration to at least one of the plurality of machine-to-machine communication devices;
   means for receiving, from the at least one of the plurality of machine-to-machine communication devices, a transmission time scheduled by the at least one of the plurality of machine-to-machine communication devices based on a network behavior detected by the at least one of the plurality of machine-to-machine communication devices;
   means for determining a schedule including the transmission time within the time duration for communication with the plurality of machine-to-machine communication devices and
   means for communicating with the at least one of the plurality of machine-to-machine communication devices according to the schedule.

33. The requestor of claim 32, wherein the plurality of messages include a request, wherein the request further requests the plurality of machine-to-machine communication devices to perform a randomization process for determining the transmission time within the time duration.

34. The requestor of claim 32, wherein the plurality of messages include a request, wherein the request comprises a minimum wait time and a maximum wait time for transmitting the information within the time duration.

35. The requestor of claim 32, wherein the time duration is determined based on at least one of:
   a communication cost;
   a network condition; or
   a network operator policy.

36. The requestor of claim 32, wherein the plurality of messages include a request, wherein the request is transmitted via at least one of a unicast message or a multicast message.

37. The requestor of claim 32, wherein the time duration comprises a set of one or more non-contiguous time intervals.

38. A device for wireless communication, comprising:
   a memory; and
   at least one processor coupled to the memory and configured to:
      receive a request from a requestor, the request requesting the device to transmit information to the requestor according to a primary time duration;
      determine at least one secondary time duration within the primary time duration for transmitting the information to the requestor;
      schedule, during a communication feasibility determination interval of the at least one secondary time duration, a transmission time within the at least one secondary time duration to transmit the information to the requestor in response to the request, the scheduling based on additional information known to the device, wherein to schedule the transmission time, the at least one processor is further configured to:
         determine, during the communication feasibility determination interval, a network behavior including at least one of a network load or a communication link condition;
      adapt the scheduling of the transmission time to transmit the information to the requestor based on the determined network behavior; and
      transmit the scheduled transmission time to the requestor.

39. The device of claim 38, wherein the request further requests the device to perform a randomization process for determining the transmission time.

40. The device of claim 39, wherein the at least one processor is configured to determine the at least one secondary time duration based on the randomization process requested by the requestor.

41. The device of claim 39, wherein the additional information comprises at least one of a device condition or a network operator policy.

42. The device of claim 41, wherein the device condition comprises at least one of device power consumption or device wake-up schedule.

43. The device of claim 39, wherein the primary time duration comprises a set of one or more non-contiguous time intervals.

44. The device of claim 39, wherein the at least one processor configured to schedule is configured to determine an absence of a constraint to transmit the information during the primary time duration based on the additional information known to the device, the at least one processor further configured to:
   transmit the information during the primary time duration to the requestor based on the absence of the constraint.

45. The device of claim 39, wherein the at least one processor configured to schedule is configured to determine a constraint to transmit the information during the primary time duration based on the additional information known to the device, the at least one processor further configured to:
   refrain from transmitting the information during the primary time duration based on the constraint.

46. The device of claim 39, wherein the request is a high priority request and the at least one processor configured to schedule is configured to determine a constraint to transmit the information during the primary time duration based on the additional information known to the device, the at least one processor further configured to:
   wait to transmit the information until near an end of the primary time duration; and
   transmit the information near the end of the primary time duration.

47. The device of claim 39, wherein the request comprises a minimum wait time and a maximum wait time for transmitting the information within the primary time duration, and wherein the at least one processor is configured to determine the at least one secondary time duration based on the minimum wait time and the maximum wait time.

48. The device of claim 39,
   wherein the network behavior includes at least one of a network load or a communication link condition.

49. The device of claim 38,
   wherein to transmit the scheduled transmission time at least one of the determined network behavior or the transmission time.

50. A requestor for wireless communication, comprising:
   a memory; and
   at least one processor coupled to the memory and configured to:
      receive an indication for transmitting a plurality of messages to a plurality of machine-to-machine communication devices;
      determine a time duration for communicating with the plurality of machine-to-machine communication devices;
      transmit at least one of the plurality of messages to obtain information associated with the time duration to at least one of the plurality of machine-to-machine communication devices;
      receive, from the at least one of the plurality of machine-to-machine communication devices, a transmission time scheduled by the at least one of the plurality of machine-to-machine communication devices based on a network behavior detected by the at least one of the plurality of machine-to-machine communication devices;
      determine a schedule including the transmission time within the time duration for communication with the plurality of machine-to-machine communication devices and
      communicate with the at least one of the plurality of machine-to-machine communication devices according to the schedule.

51. The requestor of claim 50, wherein the plurality of messages include a request, wherein the request further requests the plurality of machine-to-machine communication devices to perform a randomization process for determining the transmission time within the time duration.

52. The requestor of claim 50, wherein the plurality of messages include a request, wherein the request comprises a minimum wait time and a maximum wait time for transmitting the information within the time duration.

53. The requestor of claim 50, wherein the time duration is determined based on at least one of:
   a communication cost;
   a network condition; or
   a network operator policy.

54. The requestor of claim 50, wherein the plurality of messages include a request, wherein the request is transmitted via at least one of a unicast message or a multicast message.

55. The requestor of claim 50, wherein the time duration comprises a set of one or more non-contiguous time intervals.

56. A computer-readable medium storing computer executable code, comprising code for:
   receiving a request from a requestor, the request requesting the device to transmit information to the requestor according to a primary time duration;
   determining at least one secondary time duration within the primary time duration for transmitting the information to the requestor;
   scheduling, during a communication feasibility determination interval of the at least one secondary time duration, a transmission time within the at least one secondary time duration to transmit the information to the requestor in response to the request, the scheduling based on additional information known to the device, wherein scheduling the transmission time includes:
      determining, during a communication feasibility determination interval, the network behavior including at least one of a network load or a communication link condition;
   adapting the scheduling of the transmission time to transmit the information to the requestor based on the determined network behavior; and
   transmitting the scheduled transmission time to the requestor.

57. A computer-readable medium comprising code for:
   receiving an indication for transmitting a plurality of messages to a plurality of machine-to-machine communication devices;
   determining a time duration for communicating with the plurality of machine-to-machine communication devices;
   transmitting at least one of the plurality of messages to obtain information associated with the time duration to at least one of the plurality of machine-to-machine communication devices;
   receiving, from the at least one of the plurality of machine-to-machine communication devices, a transmission time scheduled by the at least one of the plurality of machine-to-machine communication devices based on a network behavior detected by the at least one of the plurality of machine-to-machine communication devices;
   determining a schedule including the transmission time within the time duration for communication with the plurality of machine-to-machine communication devices and
   communicating with the at least one of the plurality of machine-to-machine communication devices according to the schedule.

* * * * *